(12) United States Patent
Rakitzis et al.

(10) Patent No.: US 9,116,833 B1
(45) Date of Patent: Aug. 25, 2015

(54) EFFICIENCY FOR ERASURE ENCODING

(71) Applicant: Igneous Systems, Inc., Seattle, WA (US)

(72) Inventors: Triantaphyllos Byron Rakitzis, Seattle, WA (US); Jeffrey Douglas Hughes, Seattle, WA (US)

(73) Assignee: Igneous Systems, Inc., Seattle, WA (US)

( * ) Notice: Subject to any disclaimer, the term of this patent is extended or adjusted under 35 U.S.C. 154(b) by 0 days.

(21) Appl. No.: 14/576,095

(22) Filed: Dec. 18, 2014

(51) Int. Cl.
*G11C 29/00* (2006.01)
*G06F 11/10* (2006.01)

(52) U.S. Cl.
CPC .................................. *G06F 11/1076* (2013.01)

(58) Field of Classification Search
CPC ................................................... G06F 11/1076
See application file for complete search history.

(56) References Cited

U.S. PATENT DOCUMENTS

| | | | |
|---|---|---|---|
| 5,838,891 A | 11/1998 | Mizuno et al. | |
| 6,807,642 B2 * | 10/2004 | Yamamoto et al. | 714/6.24 |
| 7,028,154 B2 | 4/2006 | Reeves | |
| 7,035,972 B2 | 4/2006 | Guha et al. | |
| 7,133,805 B1 | 11/2006 | Dankenbring et al. | |
| 7,386,796 B1 | 6/2008 | Simpson et al. | |
| 7,437,604 B2 | 10/2008 | Davies et al. | |
| 7,444,532 B2 | 10/2008 | Masuyama et al. | |
| 7,552,289 B2 | 6/2009 | Hoch et al. | |
| 7,644,148 B2 | 1/2010 | Ranganathan et al. | |
| 7,650,532 B2 | 1/2010 | Fukui | |
| 7,861,122 B2 | 12/2010 | Cornwell et al. | |
| 7,945,730 B2 | 5/2011 | Daftardar | |
| 8,046,614 B2 | 10/2011 | Henderson et al. | |
| 8,156,381 B2 | 4/2012 | Tamura et al. | |
| 8,156,382 B1 | 4/2012 | Booth et al. | |
| 8,589,655 B2 | 11/2013 | Colgrove et al. | |
| 8,719,619 B2 | 5/2014 | Li et al. | |
| 2004/0205403 A1 | 10/2004 | Markow et al. | |
| 2005/0018341 A1 | 1/2005 | Brume | |
| 2005/0198194 A1 | 9/2005 | Burkey | |
| 2005/0228943 A1 | 10/2005 | DeCenzo et al. | |
| 2006/0224917 A1 * | 10/2006 | Kleiman et al. | 714/6 |
| 2007/0074077 A1 | 3/2007 | Markow et al. | |
| 2008/0154920 A1 | 6/2008 | Guha | |
| 2009/0063719 A1 | 3/2009 | Honjo et al. | |

(Continued)

OTHER PUBLICATIONS

Official Communication for U.S. Appl. No. 14/266,603 mailed Nov. 17, 2014 (14 pages).

(Continued)

*Primary Examiner* — Sam Rizk
(74) *Attorney, Agent, or Firm* — John W. Branch; Lowe Graham Jones PLLC

(57) ABSTRACT

Embodiments are directed towards efficient erasure coding for storage systems. A smallest integer in a set may be determined based on a number of storage devices in the storage system such that the determined integer is greater or equal to the number of storage devices. The smallest integer in the set may be determined from the set $\{2^N-1\}$ where N is an integer based on the number of storage devices. A matrix may be generated based on a number of columns equal to the determined integer and a number of rows equal to the number of columns plus a number of global repair symbol devices and plus a number of virtual repair symbol devices. Each virtual repair symbol device enables an additional of level of protection against failures in the storage system.

30 Claims, 13 Drawing Sheets

(56) References Cited

U.S. PATENT DOCUMENTS

| | | | |
|---|---|---|---|
| 2010/0049822 A1 | 2/2010 | Davies et al. | |
| 2010/0153680 A1 | 6/2010 | Baum et al. | |
| 2010/0191907 A1* | 7/2010 | Ish | 711/114 |
| 2010/0211335 A1 | 8/2010 | Gokita | |
| 2011/0307721 A1 | 12/2011 | Ouchi et al. | |
| 2012/0151262 A1 | 6/2012 | Nakayama et al. | |
| 2012/0210169 A1 | 8/2012 | Coile et al. | |
| 2012/0311381 A1 | 12/2012 | Porterfield | |
| 2013/0073880 A1 | 3/2013 | Miyazaki | |
| 2013/0132759 A1 | 5/2013 | Lathrop et al. | |
| 2013/0205181 A1* | 8/2013 | Blaum et al. | 714/763 |
| 2013/0227352 A1 | 8/2013 | Kumarasamy et al. | |
| 2013/0232289 A1 | 9/2013 | Zhong et al. | |
| 2013/0312005 A1 | 11/2013 | Chiu et al. | |
| 2013/0326269 A1 | 12/2013 | Losh et al. | |
| 2014/0047057 A1 | 2/2014 | Kuo | |
| 2014/0047300 A1 | 2/2014 | Liang et al. | |
| 2014/0068627 A1 | 3/2014 | Goh et al. | |
| 2014/0095740 A1 | 4/2014 | Ozawa | |
| 2014/0115390 A1 | 4/2014 | Coile et al. | |
| 2014/0164824 A1 | 6/2014 | Reche et al. | |
| 2014/0173306 A1 | 6/2014 | Cooper et al. | |
| 2014/0173351 A1 | 6/2014 | Afifi et al. | |
| 2014/0297038 A1 | 10/2014 | Nishioka et al. | |
| 2014/0297596 A1 | 10/2014 | Jeon et al. | |
| 2014/0317058 A1 | 10/2014 | Chang et al. | |

OTHER PUBLICATIONS

Official Communication for U.S. Appl. No. 14/596,179 mailed Apr. 29, 2015 (37 pages).

Official Communication for U.S. Appl. No. 14/596,179 mailed May 18, 2015 (5 pages).

* cited by examiner

EFFICIENCY FOR ERASURE ENCODING

TECHNICAL FIELD

This invention relates generally to managing data storage in a network, and more particularly, but not exclusively, to improving erasure encoding in a data storage system.

BACKGROUND

The growth of the amount of data generated and retained by modern enterprises continues to increase. This explosion in data has led to larger and larger data storage systems. In some cases, these data storage systems may include thousands of storage devices. Unfortunately, as number of storage devices in a storage system increases the probability of storage device failure within a storage system increases as well. A storage system may employ one or more data recovery techniques to restore data that is lost or corrupted due to storage device failures. However, as the amount of data storage continues to increase, more and more storage space and/or storage devices may be required for providing sufficient space for data protection information (repair symbols) to protect against storage failures. Thus, it is with respect to these considerations and others that the invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Description of Various Embodiments, which is to be read in association with the accompanying drawings, wherein.

DESCRIPTION OF VARIOUS EMBODIMENTS

Figure 1:
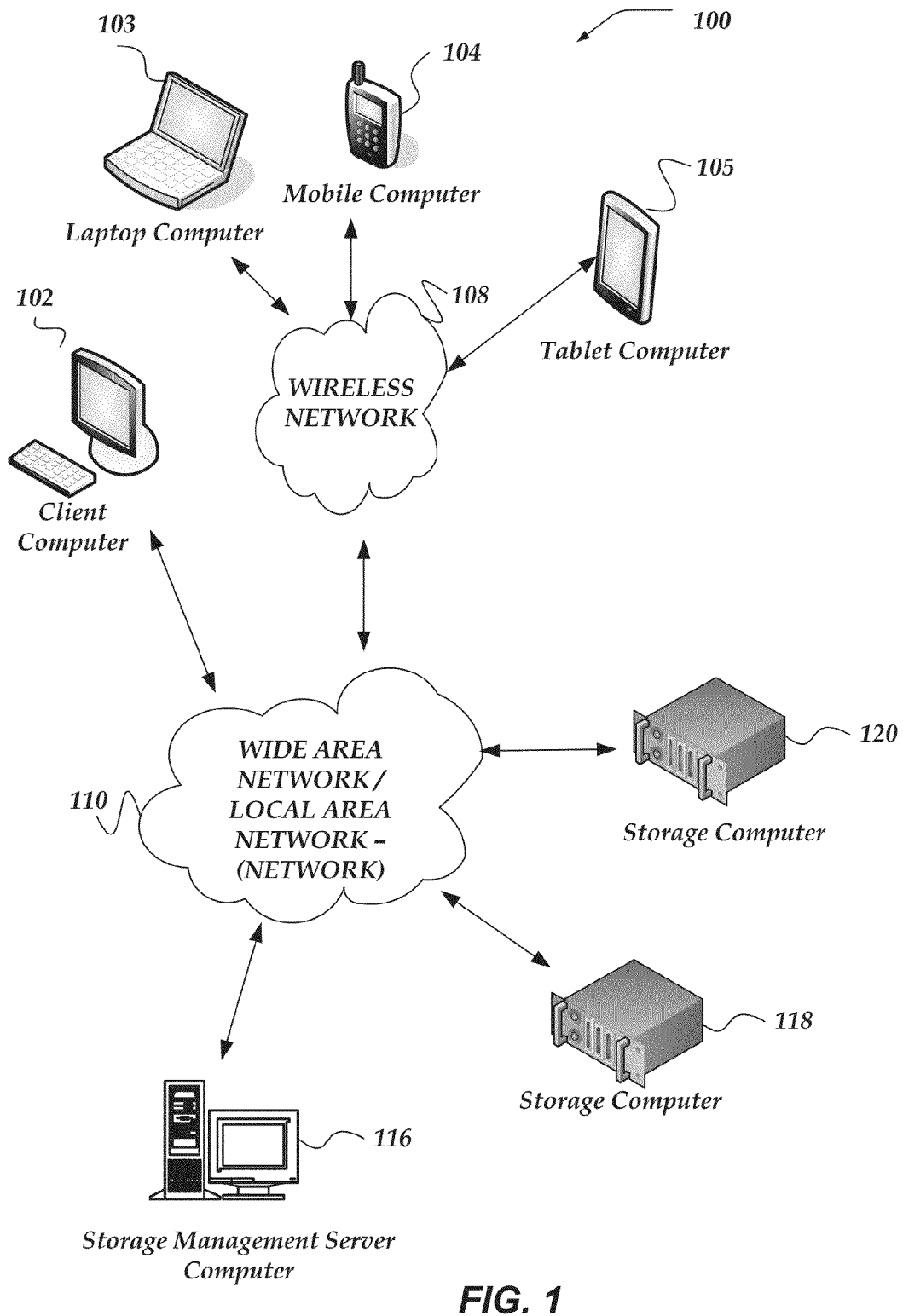
FIG. 1 shows components of one embodiment of an environment in which embodiments of the invention may be practiced.

Various embodiments now will be described more fully hereinafter with reference to the accompanying drawings, which form a part hereof, and which show, by way of illustration, specific exemplary embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media or devices. Accordingly, the various embodiments may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

For example embodiments, the following terms are also used herein according to the corresponding meaning, unless the context clearly dictates otherwise.

The term "storage device" as used herein refers to various apparatus for storing digital information, generally for use by computers. Storage devices may be fixed or removable non-volatile memory systems, such as, magnetic hard drives, magnetic tape, optical drives, solid state drives (SSD), flash memory storage, or the like. Typically, one or more storage devices may be arranged to store information for use in a computer system.

The term "storage computer" as used herein refers to a computer that is arranged to include one or more storage devices. In at least one of the various embodiments, a storage computer may include several storage devices inside a chassis. In other embodiments, the storage devices may be integrated with the storage computer.

The term "storage unit," or "storage block" as used herein refers to portions of the storage system that are dedicated to storing source data or source symbols. Storing data in a storage unit does not imply a particular data format (e.g., compressed v. non-compressed, encrypted v. unencrypted). Data located in a storage unit may be used as source symbols for erasure coding based data protection.

The term "repair symbol unit," or "repair symbol block" as used herein refers to portions of the storage system that are dedicated to storing encoding symbols generated for erasure coding data protection. Accordingly, the data stored on repair symbol units is generated from source symbols that are stored on storage units or storage blocks.

The term "CPU complex" as used herein refers to portion of a computer that generally includes, one or more CPU's, cache memory, RAM, I/O components, or the like. Herein, having one or more CPU complexes at least distinguishes a storage computer from a storage device.

The term "protection level" as used herein refers to the number of simultaneous data failures a storage system may experience before data may be irrevocably lost. In at least one of the various embodiments, protection level may be computed based on the amount of repair symbol information the storage system is storing for each storage unit. For example, if a storage system that employs erasure coding has ten hard drives for data storage and two hard drives for storing repair symbol information, under most arrangements the storage system would be considered to have a protection level of two.

The term "erasure coding" as used herein refers to methods for error correction/error recovery based on computing repair symbol information from storage information. The repair symbol information may be computed and stored separately from the storage information and may be employed to correct errors in the storage information that may be caused by data failure. Likewise, if the repair symbol information is lost because of a storage failure, it may be recomputed from the storage information. One of ordinary skill in the art will be familiar with one or more well-known techniques for implementing erasure coding in a computer storage system. One or more well-known erasure coding algorithms may be employed for generating repair symbol information and recovery from data failure, such as, Reed-Solomon coding, XORing, Hamming codes, or the like. Various standard, non-standard, or custom, erasure coding systems may be used, non-limiting examples include, RAID 5 or RAID 6, or the like.

The terms "data failure," or "storage failure" as used herein refer to any system or device failure that causes data stored in a storage computer to be corrupted, lost, involuntarily deleted, or otherwise damaged such that the data is unreadable or involuntarily modified. For example, if a storage system includes ten storage devices, the physical failure (breakdown) of one or more of the storage devices may be classified as a storage failure or data failure, since the information stored on the failed storage device may be inaccessible.

The term "repair" as used herein refers to actions performed to recover from one or more data failures in a storage system. If erasure coding is being employed, a repair may include reading repair symbol information and/or storage data from one or more storage devices and computing lost data using one or more erasure coding algorithms.

The term "repair event" as used herein refers to an event that represents either the occurrence of new data failure in a storage system or a completion of a repair of a previous data failure to a portion of the storage system.

The term "repair task" as used herein refers to one or more actions directed towards the repair of a data failure. The particular actions corresponding to each repair task may vary depending on the organization and/or arrangement of the storage system, and/or the nature of the data failure.

The term "data striping," and "data stripe" as used herein refers to the one or more methods segmenting logically sequential data, such as a file such that consecutive segments of the data may be stored on different storage devices. If erasure coding is used, the data from each storage unit block in a data stripe may be employed to compute repair symbol information for the data stripe and stored on a repair symbol block. Sometimes, data striping is referred to as disk striping.

The term "Galois Field" as used herein refers to an arithmetic finite field that contains a finite number of elements (members). A Galois Field may be defined to contain a certain number of elements where the number of elements is the order of the Galois Field. For example, a Galois Field with 256 elements is considered to have an order of 256. One of ordinary skill in the art will be familiar with the properties of Galois Fields.

The term "Vandermonde Matrix" as used herein refers to a specially constructed matrix that has various well-known properties that are useful in cryptography, erasure coding, or the like. In general, a Vandermonde Matrix is a matrix with the terms of a geometric progression in each row. One of ordinary skill in the art will be familiar with the properties of Vandermonde Matrices.

The term "generator matrix" as used herein refers to a matrix employed to generate code words as part of an erasure encoding process.

The term "code word" as used herein refers to a product that is produced by multiplying a data word (non-code word) with a generator matrix. Linear algebra techniques may be employed to generate a vector representing a code word by multiplying a vector representing a data word with a generator matrix.

Briefly stated, various embodiments are directed towards efficient erasure coding for storage systems. In at least one of the various embodiments, a smallest integer in a set may be determined based on a number of storage devices in the storage system such that the determined integer is greater or equal to the number of storage devices. In at least one of the various embodiments, determining the smallest integer in the set may include, determining the smallest integer in the set $\{2^N-1\}$ where N is an integer based on the number of storage devices.

Further, in at least one of the various embodiments, a number of columns equal to the value of the determined integer may be determined. Also, a number of rows equal to a value of the number of columns plus a number of global repair symbol devices and plus a number of virtual repair symbol devices in the storage system may be determined. In at least one of the various embodiments, the contents of each virtual repair symbol device may be determined based on one or more local repair symbol devices that are included in the storage system. In some embodiments, the contents of the one or more local repair symbol devices may be XOR'd to compute the contents of the virtual repair devices.

In at least one of the various embodiments, a generator matrix in two dimensions may be generated based on the number of columns and the number of rows such that one or more rows of the generator matrix correspond to a virtual repair symbol device. In at least one of the various embodiments, each virtual repair symbol device enables at least one additional of level of protection against physical storage device failures for the storage system.

Also, in at least one of the various embodiments, if the number of columns for the generator matrix exceeds the number of storage devices additional columns may be included in the generator matrix. Further, in at least one of the various embodiments, generating the generator matrix may include, generating a Vandermonde matrix in Galois Field 256 having dimensions based on the number of columns and the number of rows.

In at least one of the various embodiments, data may be encoded using the generator matrix and stored in the storage system. Accordingly, in at least one of the various embodiments, if a data word vector is provided for storage, an encoded vector may be generated using the generator matrix. And, the encoded vector may be distributed to the storage devices, the local repair symbol devices, and the global repair symbol devices for storage.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the invention. As shown, system 100 of FIG. 1 includes local area networks (LANs)/wide area networks (WANs)—(network) 110, wireless network 108, client computers 102-105, Storage Management Server Computer 116, Storage Computer 118, Storage Computer 120, or the like.

At least one embodiment of client computers 102-105 is described in more detail below in conjunction with FIG. 2. In one embodiment, at least some of client computers 102-105 may operate over one or more wired and/or wireless networks, such as networks 108, and/or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A web-enabled client computer may include a browser application that is configured to receive and to send web pages, web-based messages, and the like. The browser application may be configured to receive and display graphics, text, multimedia, and the like, employing virtually any web-based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), JavaScript Object Notation (JSON), or the like, to display and send a message. In one embodiment, a user of the client computer may employ the browser application to perform various activities over a network (online). However, another application may also be used to perform various online activities.

Client computers 102-105 also may include at least one other client application that is configured to receive and/or send content between another computer. The client application may include a capability to send and/or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), an electronic serial number (ESN), or other device identifier. Such information may be provided in a network packet, or the like, sent between other client computers, storage management server computer 116, storage computer 118, storage computer 120, or other computers.

Client computers 102-105 may further be configured to include a client application that enables an end-user to log into an end-user account that may be managed by another computer, such as storage management server computer 116, storage computer 118, storage computer 120, or the like. Such an end-user account, in one non-limiting example, may be configured to enable the end-user to manage one or more online activities, including in one non-limiting example, project management, software development, system administration, configuration management, search activities, social networking activities, browse various websites, communicate with other users, or the like.

Wireless network 108 is configured to couple client computers 103-105 and its components with network 110. Wireless network 108 may include any of a variety of wireless sub-networks that may further overlay stand-alone ad-hoc networks, and the like, to provide an infrastructure-oriented connection for client computers 103-105. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, and the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, a cloud-based network, a cloud instance, or the like.

Network 110 is configured to couple network computers with other computers, including, storage management server computer 116, storage computer 118, storage computer 120, client computers 102-105 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

One embodiment of storage management server computer 116 is described in more detail below in conjunction with FIG. 3. Briefly, however, storage management server computer 116 includes virtually any network computer capable of managing data storage in network environment for one or more applications or services.

Although FIG. 1 illustrates storage management server computer 116, storage computer 118, storage computer 120 each as a single computer, the innovations and/or embodiments are not so limited. For example, one or more functions of storage management server computer 116, storage computer 118, storage computer 120, or the like, may be distributed across one or more distinct network computers. Moreover, storage management server computer 116, storage computer 118, storage computer 120 are not limited to a particular configuration such as the one shown in FIG. 1. Thus, in one embodiment, storage management server computer 116, storage computer 118, or storage computer 120 may be implemented using a plurality of network computers. In other embodiments, server computer may operate as a plurality of network computers within a cluster architecture, a peer-to-peer architecture, or the like. Further, in at least one of the various embodiments, storage management server computer 116, storage computer 118, or storage computer 120 may be implemented using one or more cloud instances in one or more cloud networks.

Also, in at least one of the various embodiments, one or more storage management server computers, or at least some or all of the features thereof, may be incorporated in a storage computer, such as, storage computer 118, or storage computer 120. Accordingly, these innovations and embodiments are not to be construed as being limited to a single environment, and other configurations, and architectures are also envisaged.

Illustrative Client Computer

Figure 2:
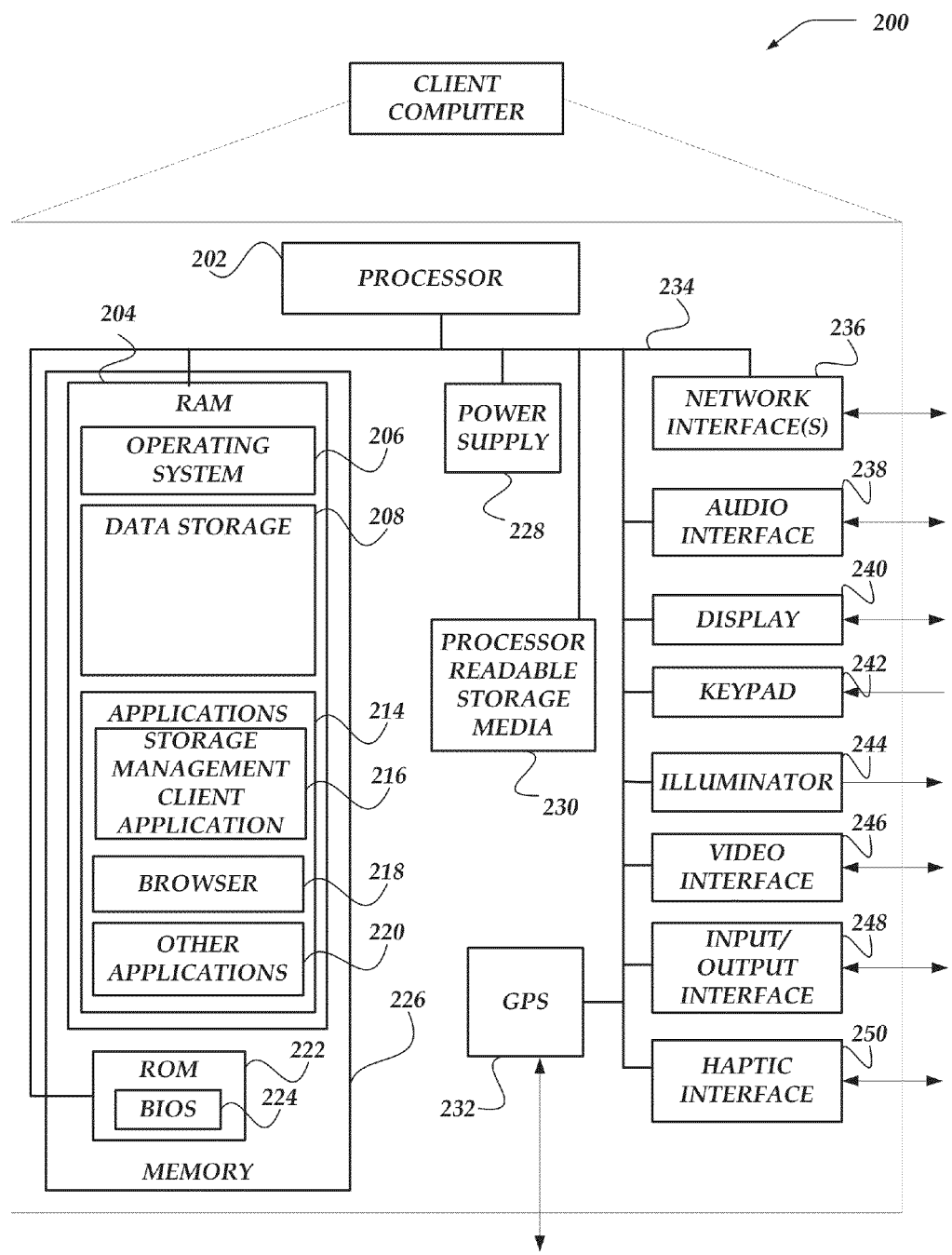
FIG. 2 shows one embodiment of a client computer that may be included in a system in accordance with at least one of the various embodiments.

FIG. 2 shows one embodiment of client computer 200 that may be included in a system in accordance with at least one of the various embodiments. Client computer 200 may include many more or less components than those shown in FIG. 2. However, the components shown are sufficient to disclose an illustrative embodiment for practicing the present invention. Client computer 200 may represent, for example, one embodiment of at least one of client computers 102-105 of FIG. 1.

As shown in the figure, client computer 200 includes a processor 202 in communication with a mass memory 226 via a bus 234. In some embodiments, processor 202 may include one or more central processing units (CPU). Client computer 200 also includes a power supply 228, one or more network interfaces 236, an audio interface 238, a display 240, a keypad 242, an illuminator 244, a video interface 246, an input/output interface 248, a haptic interface 250, and a global positioning system (GPS) receiver 232.

Power supply 228 provides power to client computer 200. A rechargeable or non-rechargeable battery may be used to provide power. The power may also be provided by an external power source, such as an alternating current (AC) adapter or a powered docking cradle that supplements and/or recharges a battery.

Client computer 200 may optionally communicate with a base station (not shown), or directly with another computer. Network interface 236 includes circuitry for coupling client computer 200 to one or more networks, and is constructed for use with one or more communication protocols and technologies including, but not limited to, GSM, CDMA, TDMA, GPRS, EDGE, WCDMA, HSDPA, LTE, user datagram protocol (UDP), transmission control protocol/Internet protocol (TCP/IP), short message service (SMS), WAP, ultra wide band (UWB), IEEE 802.16 Worldwide Interoperability for Microwave Access (WiMax), session initiated protocol/real-time transport protocol (SIP/RTP), or any of a variety of other wireless communication protocols. Network interface 236 is sometimes known as a transceiver, transceiving device, or network interface card (NIC).

Audio interface 238 is arranged to produce and receive audio signals such as the sound of a human voice. For example, audio interface 238 may be coupled to a speaker and microphone (not shown) to enable telecommunication with others and/or generate an audio acknowledgement for some action.

Display 240 may be a liquid crystal display (LCD), gas plasma, light emitting diode (LED), organic LED, or any other type of display used with a computer. Display 240 may also include a touch sensitive screen arranged to receive input from an object such as a stylus or a digit from a human hand.

Keypad 242 may comprise any input device arranged to receive input from a user. For example, keypad 242 may include a push button numeric dial, or a keyboard. Keypad 242 may also include command buttons that are associated with selecting and sending images.

Illuminator 244 may provide a status indication and/or provide light. Illuminator 244 may remain active for specific periods of time or in response to events. For example, when illuminator 244 is active, it may backlight the buttons on keypad 242 and stay on while the client computer is powered. Also, illuminator 244 may backlight these buttons in various patterns when particular actions are performed, such as dialing another client computer. Illuminator 244 may also cause light sources positioned within a transparent or translucent case of the client computer to illuminate in response to actions.

Video interface 246 is arranged to capture video images, such as a still photo, a video segment, an infrared video, or the like. For example, video interface 246 may be coupled to a digital video camera, a web-camera, or the like. Video interface 246 may comprise a lens, an image sensor, and other electronics. Image sensors may include a complementary metal-oxide-semiconductor (CMOS) integrated circuit, charge-coupled device (CCD), or any other integrated circuit for sensing light.

Client computer 200 also comprises input/output interface 248 for communicating with external devices, such as a headset, or other input or output devices not shown in FIG. 2. Input/output interface 248 can utilize one or more communication technologies, such as USB, infrared, Bluetooth™, or the like.

Haptic interface 250 is arranged to provide tactile feedback to a user of the client computer. For example, the haptic interface 250 may be employed to vibrate client computer 200 in a particular way when another user of a computer is calling. In some embodiments, haptic interface 250 may be optional.

Client computer 200 may also include GPS transceiver 232 to determine the physical coordinates of client computer 200 on the surface of the Earth. GPS transceiver 232, in some embodiments, may be optional. GPS transceiver 232 typically outputs a location as latitude and longitude values. However, GPS transceiver 232 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 232 can determine a physical location within millimeters for client computer 200; and in other cases, the determined physical location may be less precise, such as within a meter or significantly greater distances. In one embodiment, however, client computer 200 may through other components, provide other information that may be employed to determine a physical location of the computer, including for example, a Media Access Control (MAC) address, IP address, or the like.

Mass memory 226 includes a Random Access Memory (RAM) 204, a Read-only Memory (ROM) 222, and other storage means. Mass memory 226 illustrates an example of computer readable storage media (devices) for storage of information such as computer readable instructions, data structures, program modules or other data. Mass memory 226 stores a basic input/output system (BIOS) 224, or the like, for controlling low-level operation of client computer 200. The mass memory also stores an operating system 206 for controlling the operation of client computer 200. It will be appreciated that this component may include a general-purpose operating system such as a version of UNIX, or LINUX™, or a specialized client communication operating system such as Microsoft Corporation's Windows Mobile™, Apple Corporation's iOS™, Google Corporation's Android™, or the like. The operating system may include, or interface with a Java virtual machine module that enables control of hardware components and/or operating system operations via Java application programs.

Mass memory 226 further includes one or more data storage 208, which can be utilized by client computer 200 to store, among other things, applications 214 and/or other data. For example, data storage 208 may also be employed to store information that describes various capabilities of client computer 200. The information may then be provided to another computer based on any of a variety of events, including being sent as part of a header during a communication, sent upon request, or the like. Data storage 208 may also be employed to store social networking information including address books, buddy lists, aliases, user profile information, user credentials, or the like. Further, data storage 208 may also store messages, web page content, or any of a variety of user generated content.

At least a portion of the information stored in data storage 208 may also be stored on another component of client computer 200, including, but not limited to processor readable storage media 230, a disk drive or other computer readable storage devices (not shown) within client computer 200.

Processor readable storage media 230 may include volatile, non-transitive, non-transitory, nonvolatile, removable, and non-removable media implemented in any method or technology for storage of information, such as computer- or processor-readable instructions, data structures, program modules, or other data. Examples of computer readable storage media include RAM, ROM, Electrically Erasable Programmable Read-only Memory (EEPROM), flash memory or other memory technology, Compact Disc Read-only Memory (CD-ROM), digital versatile disks (DVD) or other optical storage, magnetic cassettes, magnetic tape, magnetic disk storage or other magnetic storage devices, or any other physical medium which can be used to store the desired information and which can be accessed by a computer. Processor readable storage media 230 may also be referred to herein as computer readable storage media and/or computer readable storage device.

Applications 214 may include computer executable instructions which, when executed by client computer 200, transmit, receive, and/or otherwise process network data. Network data may include, but is not limited to, messages (e.g. SMS, Multimedia Message Service (MMS), instant message (IM), email, and/or other messages), audio, video, and enable telecommunication with another user of another client computer. Applications 214 may include, for example, a browser 218, and other applications 220. Further, applications 214 may include storage management client application 216 for integrating one or more file systems with a storage system and/or integrating with a storage management application, or the like.

Browser 218 may include virtually any application configured to receive and display graphics, text, multimedia, messages, and the like, employing virtually any web based language. In one embodiment, the browser application is enabled to employ HDML, WML, WMLScript, JavaScript, SGML, HTML, XML, and the like, to display and send a message. However, any of a variety of other web-based programming languages may be employed. In one embodiment, browser 218 may enable a user of client computer 200 to communicate with another network computer, such as storage management server computer 116, storage computer 118, and/or storage computer 120 as shown in FIG. 1.

Other applications 220 may include, but are not limited to, calendars, search programs, email clients, IM applications, SMS applications, voice over Internet Protocol (VOIP) applications, contact managers, task managers, transcoders, database programs, word processing programs, software development tools, security applications, spreadsheet programs, games, search programs, and so forth.

Illustrative Network Computer

Figure 3:
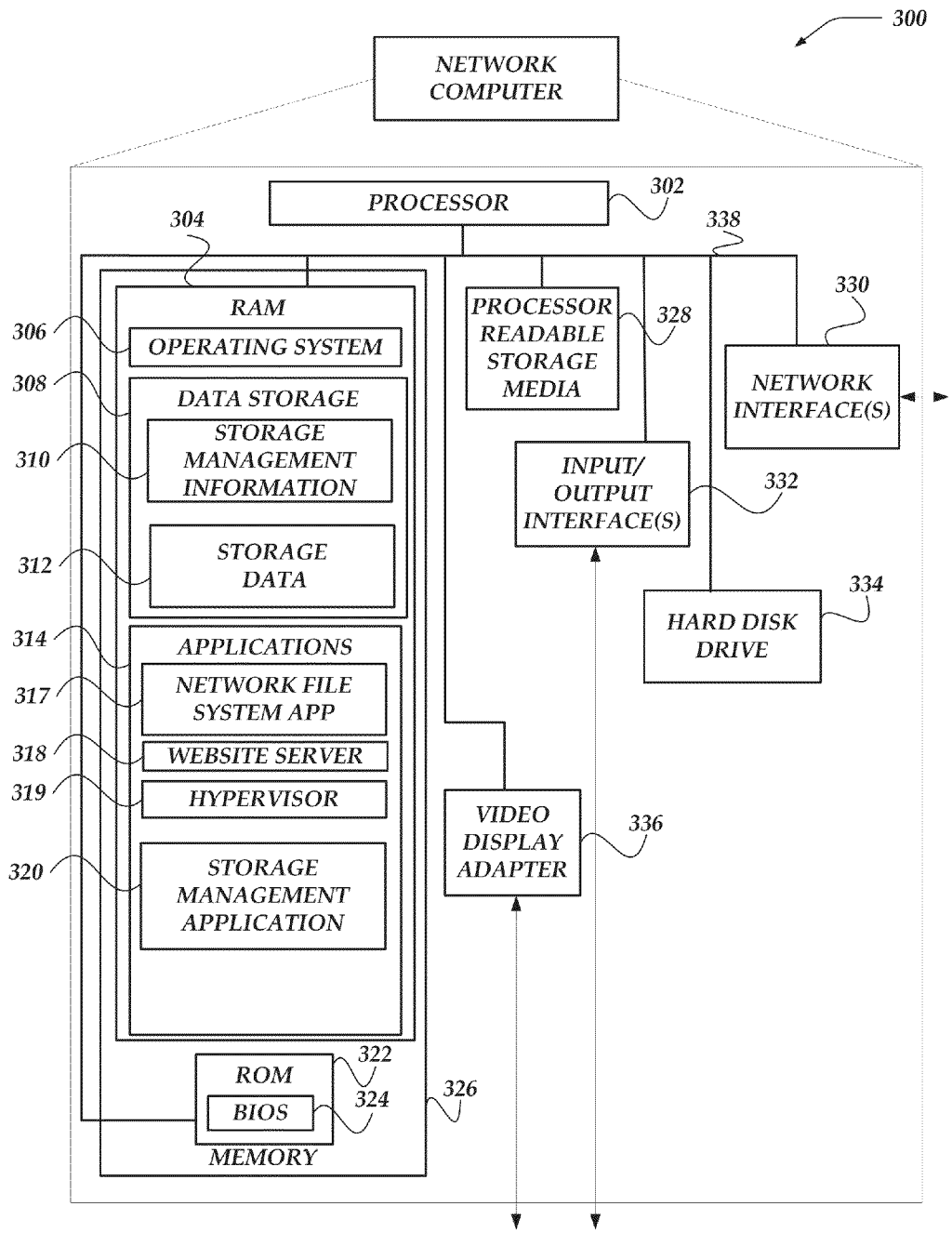
FIG. 3 shows one embodiment of a network computer, according to one embodiment of the invention.

FIG. 3 shows one embodiment of a network computer 300, according to one embodiment of the invention. Network computer 300 may include many more or less components than those shown. The components shown, however, are sufficient to disclose an illustrative embodiment for practicing at least one of the various embodiments. Network computer 300 may be configured to operate as a server, client, peer, a host, cloud instance, or any other computer. Network computer 300 may represent, for example storage management server computer 116, and/or other network computers, such as, computers comprising, storage computer 118, or storage computer 120.

Network computer 300 includes processor 302, processor readable storage media 328, network interface unit 330, an input/output interface 332, hard disk drive 334, video display adapter 336, and memory 326, all in communication with each other via bus 338. In some embodiments, processor 302 may include one or more central processing units.

As illustrated in FIG. 3, network computer 300 also can communicate with the Internet, or other communication networks, via network interface unit 330, which is constructed for use with various communication protocols including the TCP/IP protocol. Network interface unit 330 is sometimes known as a transceiver, transceiving device, or network interface card (NIC).

Network computer 300 also comprises input/output interface 332 for communicating with external devices, such as a keyboard, or other input or output devices not shown in FIG. 3. Input/output interface 332 can utilize one or more communication technologies, such as USB, infrared, NFC, Bluetooth™, or the like.

Memory 326 generally includes RAM 304, ROM 322 and one or more permanent mass storage devices, such as hard disk drive 334, tape drive, optical drive, and/or floppy disk drive. Memory 326 stores operating system 306 for controlling the operation of network computer 300. Any general-purpose operating system may be employed. Basic input/output system (BIOS) 324 is also provided for controlling the low-level operation of network computer 300.

Although illustrated separately, memory 326 may include processor readable storage media 328. Processor readable storage media 328 may be referred to and/or include computer readable media, computer readable storage media, and/or processor readable storage device. Processor readable storage media 328 may include volatile, nonvolatile, non-transitory, non-transitive, removable, and non-removable media implemented in any method or technology for storage of information, such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by a computer.

Memory 326 further includes one or more data storage 308, which can be utilized by network computer 300 to store, among other things, applications 314 and/or other data. For example, data storage 308 may also be employed to store information that describes various capabilities of network computer 300. The information may then be provided to another computer based on any of a variety of events, including being sent as part of a header during a communication, sent upon request, or the like. Data storage 308 may also be employed to store messages, web page content, or the like. At least a portion of the information may also be stored on another component of network computer 300, including, but not limited to processor readable storage media 328, hard disk drive 334, or other computer readable storage medias (not shown) within network computer 300.

Data storage 308 may include a database, text, spreadsheet, folder, file, or the like, that may be configured to maintain and store user account identifiers, user profiles, email addresses, IM addresses, and/or other network addresses; or the like. Data storage 308 may further include program code, data, algorithms, and the like, for use by a processor, such as processor 302 to execute and perform actions. In one embodiment, at least some of data store 308 might also be stored on another component of network computer 300, including, but not limited to processor-readable storage media 328, hard disk drive 334, or the like.

Further, in at least one of the various embodiments, a network computer, such as, storage management computer 116, storage computer 118 or storage computer 120, may include one or more hard drives, optical drives, solid state storage drives or the like, for storing the data stored by a storage system.

Data storage 308 may include storage management information 310. In at least one of the various embodiments, storage management information 310 may include information, such as, storage computer/device status, capacity information, user profiles, or the like. Also, in at least one of the various embodiments, data storage 308 may include storage data 312 representing actual data that may be stored on a storage device and/or a storage computer.

Applications 314 may include computer executable instructions, which may be loaded into mass memory and run on operating system 306. Examples of application programs may include transcoders, schedulers, calendars, database programs, word processing programs, Hypertext Transfer Protocol (HTTP) programs, customizable user interface programs, IPSec applications, encryption programs, security programs, SMS message servers, IM message servers, email servers, account managers, and so forth. Applications 314 may also include, network file system application 317, website server 318, hypervisor 319, storage management application 320, or the like.

Website server 318 may represent any of a variety of information and services that are configured to provide content, including messages, over a network to another computer. Thus, website server 318 can include, for example, a web server, a File Transfer Protocol (FTP) server, a database server, a content server, email server, or the like. Website server 318 may provide the content including messages over the network using any of a variety of formats including, but not limited to WAP, HDML, WML, SGML, HTML, XML, Compact HTML (cHTML), Extensible HTML (xHTML), or the like.

Illustrative Logical System Architecture

In at least one of the various embodiments, improved efficiency for erasure encoding may be performed in a data storage system. In at least one of the various embodiments, storage computers, storage devices, or the like, may be organized into different arrangements not limited to those described below depending on the specific storage requirements of the applications and/or services that may be using the storage systems.

Figure 4:
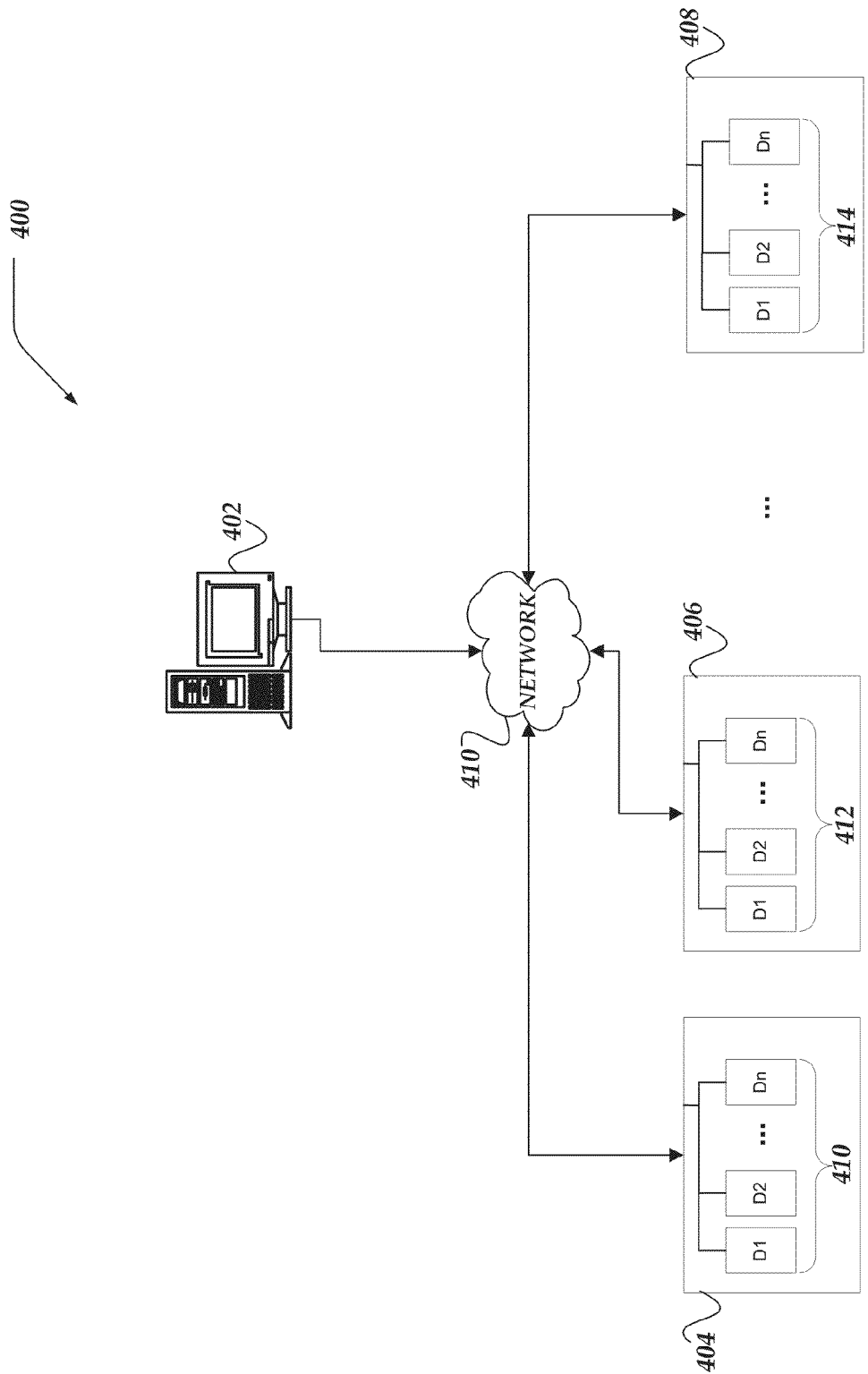
FIG. 4 shows a system that is a portion of a data storage system in accordance with at least one of the various embodiments.

FIG. 4 shows system 400 that is a portion of a data storage system in accordance with at least one of the various embodiments. In at least one of the various embodiments, system 400 may be comprised of a storage management server computer, such as, storage management server computer 402, as well as, one or more storage computers, such as, storage computer 404, storage computer 406, storage computer 408, or the like. In at least one of the various embodiments, storage management server computer 402, storage computer 404, storage computer 406, and/or storage computer 408, may comprise network computers, similar to network computer 300.

In at least one of the various embodiments, each computer may be interconnected over a network, such as, network 410. In at least one of the various embodiments, network 410 may be comprised similarly as wireless network 108 and/or network 110.

In at least one of the various embodiments, the storage computers may be arranged to include one or more storage devices, such as, storage devices 410, storage devices 412, or storage devices 414. In various embodiments, storage computers may include more or fewer storage devices than illustrated in FIG. 4. In at least one of the various embodiments, storage computers may include a single storage device. And, in some embodiments, one or more storage computers may be arranged to be included in an enclosure or chassis which in turn may be interconnected to other computer and/or storage computers over network 410.

In at least one of the various embodiments, the functionality of storage management server computer 402 may be incorporated directly into one or more storage computers, such as, storage computer 404, storage computer 406, storage computer 408, or the like. In such embodiments a storage management application, such as, storage management application 320 may be operative on one or more of the storage computers. Further, in at least one of the various embodiments, some or all functionality of the storage management server computer may be implemented directly on each storage device. Accordingly, in at least one of the various embodiments, each storage device may be considered a storage computer. Or, alternatively, they may be considered a storage computer that includes a single storage device.

In at least one of the various embodiments, storage management server 402 and/or storage computers 404-408, or portions thereof, may be implemented in a cloud environment where one or more of the computer may be virtual machines.

Figures 5A, 5B:
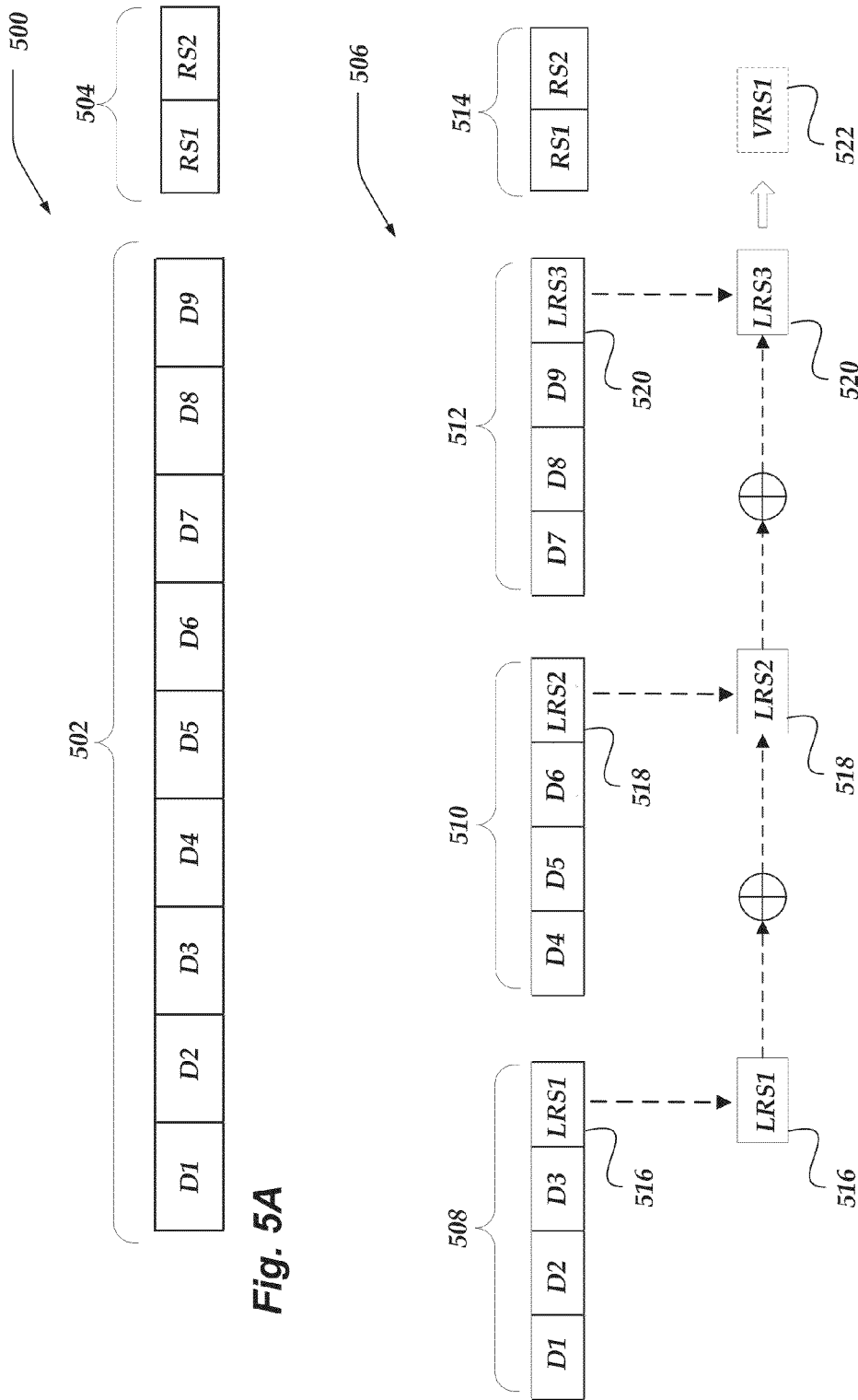
FIGS. 5A-5B illustrate portions of logical architecture of for data storage in accordance with at least one of the various embodiments.

FIGS. 5A-5B illustrate portions of logical architecture of for data storage in accordance with at least one of the various embodiments. One of ordinary skill in the art will appreciate that there are various well-known ways to arrange data storage to support erasure coding for error recovery. Generally, erasure coding requires repair symbol information to be computed and stored in addition to the source information that is being stored. The repair symbol information may be used to restore data that may be lost or corrupted. In some embodiments, amount the repair symbol information stored for each storage unit (e.g., data block) corresponds to the number of simultaneous failures that may be recovered from. FIGS. 5A-5B illustrate two different ways data and repair symbol information may be arranged in a data storage system. In at least one of the various embodiments, a particular set of data storage units with corresponding repair symbol storage unit may be considered to be a data stripe.

The examples illustrated with these figures are representative of the different types of well-known storage arrangements where these innovations may be applicable. One of ordinary skill in the art will appreciate that the examples below represent a generalized discussion a few of the strategies for using erasure coding with data storage. Actual data storage embodiments may include many more or fewer components than are described herein, but these figures and their accompanying descriptions are at least sufficient to enable one of ordinary skill in the art to practice the claimed innovations. Further, these illustrative embodiments are presented to provide context and clarification of the claimed innovations. However, the innovations are not so limited and may be employed with practically any data storage architecture.

FIG. 5A illustrates a data storage architecture for system 500 that includes data storage units 502 that may be comprised of storage units or storage devices, such as, hard drives. Also, in at least this example, there are two levels of protection provided by global repair symbol units 504.

In at least one of the various embodiments, one or more well-known data striping and/or erasure coding methods may be employed to encode and distribute data across the storage units with their corresponding repair symbol information stored in repair symbol (RS) units 504. In this example, system 500 is illustrated as having two repair symbol units which enable system 500 to recover from two simultaneous failures. Accordingly, in the example, if three or more simultaneous failures occur, data may be lost because of failures that may be unrecoverable using erasure coding (decoding). Note, there may be other recovery methods such as restoring from another replication store or backup of the data, but these will operate separate from the erasure coding that may be used in system 500.

In at least one of the various embodiments, system 500 may be referred to as having two levels of protection, because it has two repair symbol units enabling it to withstand two simultaneous failures. In at least one of the various embodiments, storage systems may be arranged to have more or fewer repair symbol units providing more or less protection. For example, if a storage system includes three repair symbol units it may be described as having three levels of protection because it may be able to recover from three simultaneous failures before irrevocably losing data. One or more well-known erasure coding algorithms may be employed for generating repair symbol information and recovery from data failure, such as, Reed-Solomon coding, Cauchy-Reed-Solomon coding, XORing, Hamming codes, or the like, or combination thereof.

In at least one of the various embodiments, in system 500, as data is stored it may be striped such that a portion of the data may be stored on each of storage devices 502 and computed repair symbol information for the data may be stored on each of repair symbol devices 504. In this example, such an arrangement may be referred to as 9+2 storage, indicating nine storage devices with two repair symbol devices—resulting in a global protection level of two.

In at least one of the various embodiments, system 500 may be arranged to include one or more data stripes, it is illustrated herein as a single stripe for brevity and clarity. However, one of ordinary skill in the art will appreciate that embodiments having more data stripes are envisaged and that they are within the scope of the claimed innovations. Further, the terms storage units and storage devices are used interchangeably herein to represent hard drives, SSD's, or the like, that may be used for storing encoded data. The terms repair symbol units and repair symbol devices represent hard drives, SSD's, or the like, that are intended to provide protection against storage device failures.

FIG. 5B illustrates a data storage architecture for storage system 506 that is arranged differently than storage system 500 in FIG. 5A. In at least one of the various embodiments, system 506 may be arranged to support local repair and/or local repair symbols (LRS). Accordingly, in at least one of the various embodiments, the storage units may be arranged into storage groups, such as storage group 508, storage group 510, and storage group 512. With global repair symbol protection provided by repair symbol information stored in repair symbol (RS) units 514. Also, in at least one of the various embodiments, repair symbol information for a given storage group may be stored in storage units that may be stored locally to the storage group. For example, in system 506, storage group 508 includes local repair symbol unit 516, storage group 510 includes local repair symbol unit 518, and storage group 512 includes local repair symbol unit 520.

In at least one of the various embodiments, local repair symbol information may be used to recover from one or more failures that occur in the local group. Typically, local repair symbol information may be arranged to enable recovery from one error that may occur in its corresponding local storage group. But, in some embodiments, local repair symbol information may be arranged to enable recovery from more than one error in its corresponding local storage group by adding more local repair information to each group.

Accordingly, in at least one of the various embodiments, if the number of simultaneous failures covered by the local repair symbol unit is exceeded, the system may fallback to rely on the global repair symbol units, such repair symbol units 514.

In at least one of the various embodiments, LRS units/devices may enable data recovery from a local storage group failure to resolve faster and/or with less performance impact on the storage management application. For example, if a storage unit in storage group 508 experiences a failure, the recovery process may require three data reads, one read from each of the two surviving storage units in the group and one read from the local repair symbol unit to recover the data. For comparison, if one failure occurs in system 500 at least nine read operations will be required to recover the lost data—one read from each surviving storage unit, and one read from the repair symbol units. However, in system 506, if the number of failures exceed the protection level of the local repair symbol units, recovery may require reads from all surviving storage units and each global repair symbol unit.

In at least one of the various embodiments, the local repair symbol LRS units may be combined together to generate a virtual repair symbol (VRS) unit/device that provides another level of global protection. For example, local repair symbol unit 516 may be combined with local repair symbol unit 518 and with local repair symbol unit 520 to produce virtual repair symbol unit 522. In at least one of the various embodiments, the contents of local repair symbol units may be XOR'd together to compute that contents for virtual repair symbol unit 522.

Accordingly, in at least one of the various embodiments, virtual repair symbol unit 522 provides another global protection level for system 506. In at least one of the various embodiments, virtual repair symbol unit 522 enables the additional protection while not increasing the amount real storage and/or storage devices required for repair symbols. This because there is no physical VRS device, it is a virtual unit/device that is computed from the physical device comprising local repair symbol devices.

In at least one of the various embodiments, encoding/decoding as described in more detail below takes advantage of the virtual repair symbol devices to produce additional global protection levels from the physical devices that comprise the local repair symbol devices.

In at least one of the various embodiments, system 506 may be arranged to include one or more data stripes, it is illustrated herein as a single stripe for brevity and clarity. However, one of ordinary skill in the art will appreciate that embodiments having one or more data stripes are envisaged and that they are within the scope of the claimed innovations. Further, the terms storage units and storage devices are used interchangeably herein to represent hard drives, SSD's, or the like, that may be used for storing encoded data. The terms repair symbol units and repair symbol devices represent hard drives, SSD's, or the like, that are intended to provide protection against device failures.

Figure 6:
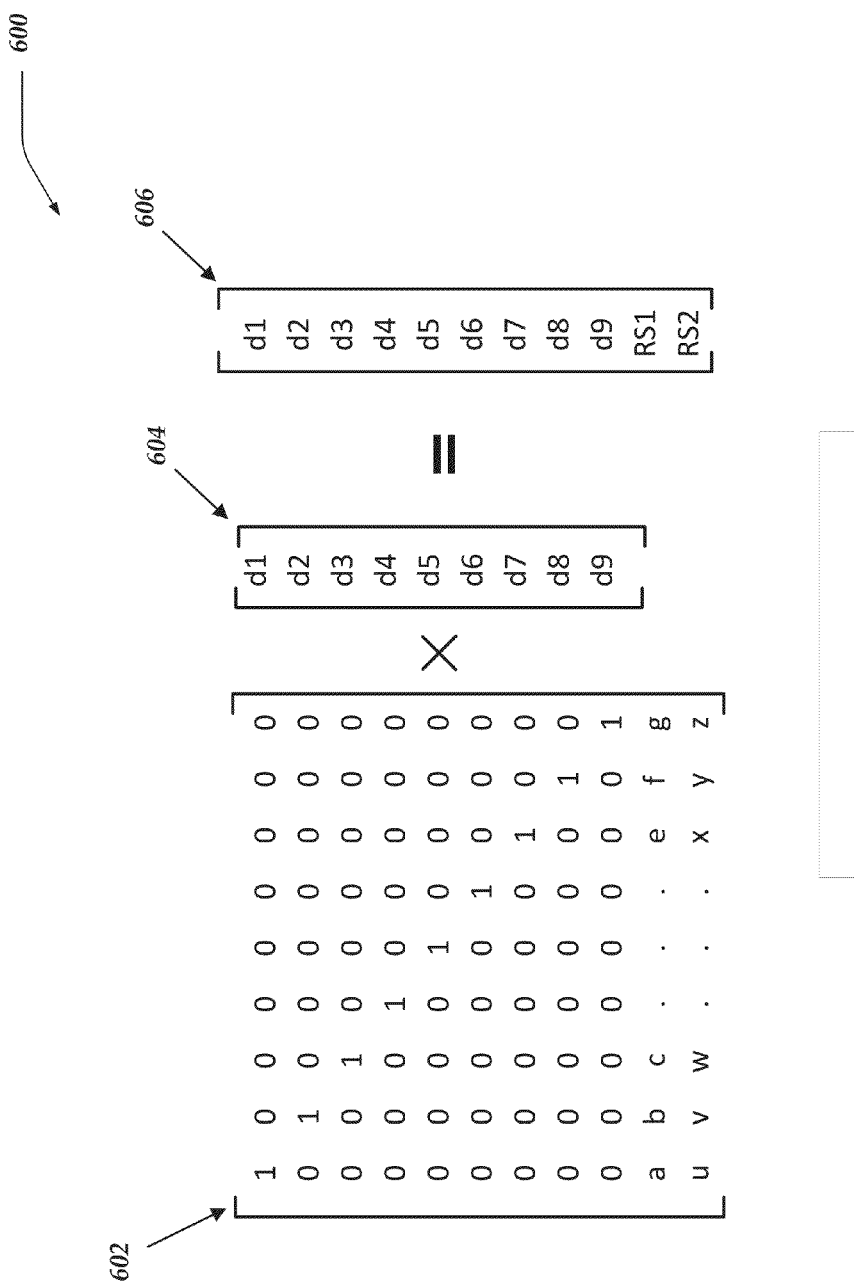
FIG. 6 illustrates an encoding operation for a system in accordance with at least ordinary encoding.

FIG. 6 illustrates an encoding operation for system 600 in accordance with at least ordinary encoding. One of ordinary skill in the art will be familiar with the implementation of various erasure encoding techniques, such as, Reed-Solomon coding. Accordingly, in the interest of brevity a detailed description of the operations for implementing standard coding techniques is not shown here. However, Reed-Solomon encoding is briefly discussed here to provide clarity and context for the innovations that are discussed below with FIGS. 7-13.

Erasure encoding techniques, such as, Reed-Solomon can be explained and implemented using linear algebra and matrix operations. In at least one of the various embodiments, hardware and/or software may be arranged to enable a storage system to encode/decode stored data. The data that is intended to be protected (encoded) may be transformed in encoded data, sometimes referred to as code words. The code words may be produced by multiplying a specially selected and formed matrix known as a generator matrix with a vector comprising the source data. The product of the generator matrix and the source data vector is an encoded data vector. The encoded data vector will include additional elements that may correspond to the global protection levels afforded by the erasure coding. In FIG. 6, local repair symbols may be disregarded.

In this example, matrix 602 is a generator matrix, vector 604 represents the source data vector, and vector 606 represents the encoded data vector. For clarity, each element of vector 604 corresponds to data storage units/devices in a data storage system, such as data storage units 502 in FIG. 5A (e.g., D1-D9). Likewise, for vector 606 the first nine elements relate to the storage unit and the last two elements relate to the repair symbol units 504 (RS1 and RS2) shown in FIG. 5A.

Generator matrix 602 is a specially arranged Vandermonde matrix over a GF(256) Galois Field. The properties of Vandermonde matrices and Galois Fields will be familiar to those of ordinary skill in the art. Accordingly, generator matrix 602 is selected such that it is mathematically guaranteed to be invertible (non-singular). Meaning, that each row may represent linearly independent equations. A Vandermonde matrix over Galois Field 256 satisfies these requirements.

As per Reed-Solomon coding, the generator matrix is arranged using basic matrix operations to have the first n rows that correspond to the storage units be in the form of a identity matrix—as shown by generator 602. The operations for producing the identity matrix portion of the generator matrix are not shown here but they comprise a series of linear transformations in which a multiple of one column may be added to another. Such operations will be familiar to one of ordinary skill in the art. The particular operations and the resulting values may vary depending on the Galois Field that is selected for the generator matrix.

In some cases, generator matrix 602 may be described as a (n+k) by n matrix, where n is the number of storage units and k is the number of global repair symbol units. Or, similarly, it may be described as a n by n matrix and a n by k matrix stacked on top of each other. Where the n by n matrix is an identity matrix (as shown in FIG. 6). One of ordinary skill in the art will be familiar with these types of operations with respect to erasure coding.

Accordingly, generator matrix 602 is selected to have at least one row for each storage unit/device and one row for each repair symbol unit/device and a number columns that match the number of storage units/device. Thus, in this example, generator matrix 602 is selected to have 11 rows and 9 columns. Note, since the actual values of the n by k portion of generator matrix 602 (the bottom two rows) may vary depending on the selection of the Galois Field, representative placeholders are used in the figure. Thus, rather than having values of 'a b c . . . efg', in a live storage system, the last two rows of generator matrix 602 would comprise values in the Galois Field that were generated as a result of transforming n by n rows of the Vandermonde matrix into an identity matrix portion of generator matrix 602.

Alternatively, the above described encoding process may be described using equation 608. In equation 608, G represents a generator matrix, such as, generator matrix 602, D represents a data vector, such as, data vector 604, and E represents an encoded data vector (code word), such as, encoded data vector 606.

In at least one of the various embodiments, a storage management application, such as, storage management application 320, and/or a network file system application, such as network file system application 317, may be arranged to process data for storage using an erasure coding process such as described above. Accordingly, in at least one of the various embodiments, if a data word, such as, vector 604 is provided for storage it may be encoded using a generator matrix such as generator matrix 602 to produce encoded vector 606 for storage.

Figure 7:
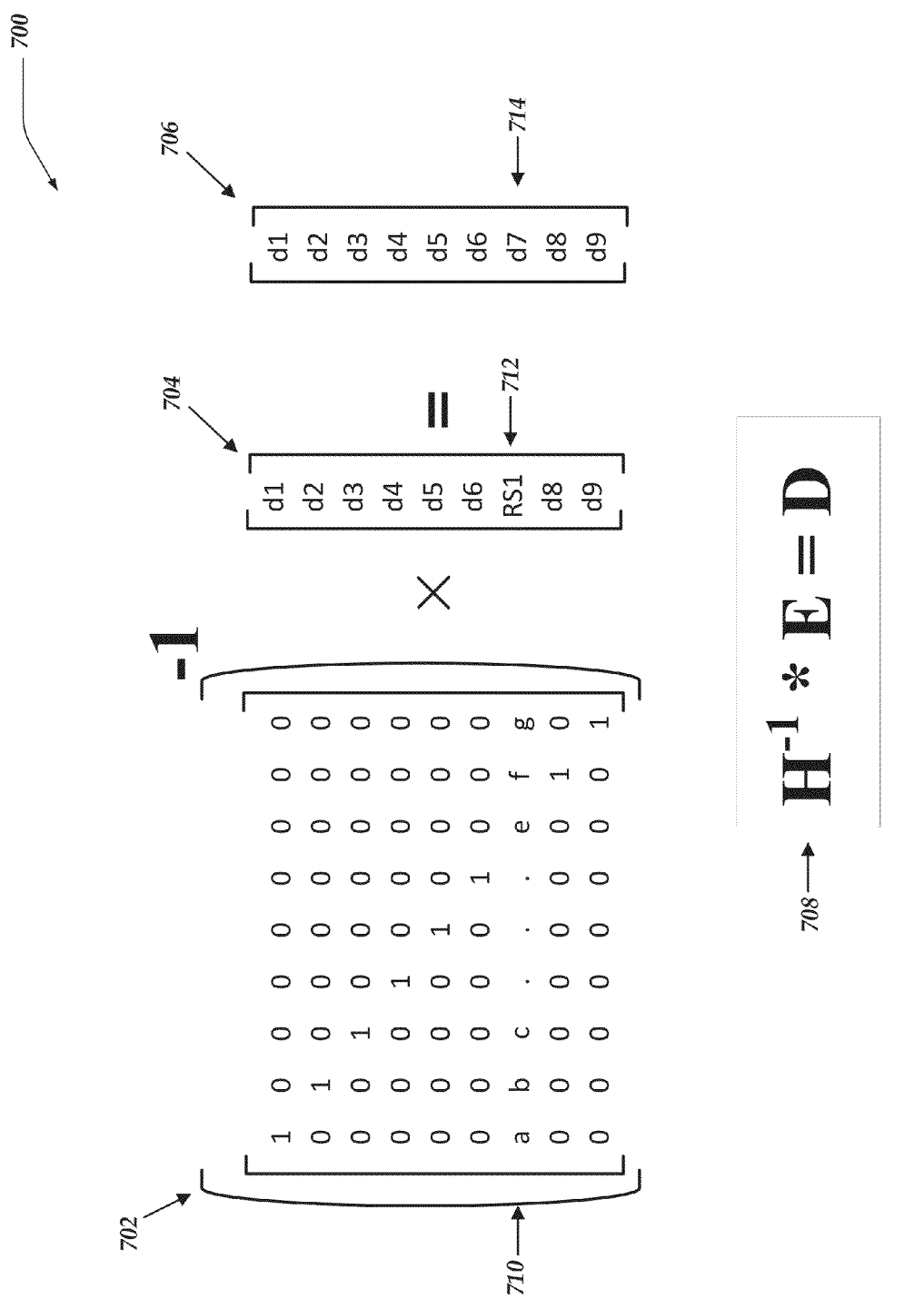
FIG. 7 illustrates an erasure recovery operation for a system that is in accordance with at least one erase coding embodiment.

FIG. 7 illustrates an erasure recovery operation for system 700 that is in accordance with at least one erasure encoding embodiment. The purpose of the encoding described in FIG. 6 is to enable data to be recovered if a storage device (disk drive) that is part of a storage system is lost or otherwise unavailable. Generally speaking the encoding operations are reversed to produce the source data from the remaining storage devices that are operative in the system. Recovery may be illustrated by equation 708. In equation 708, $H^{-1}$ represents the inverse of a selected portion of the generator matrix, such as, matrix 702, E represents an encoded data vector, such as, vector 704, and D represents a recovered source data vector, such as, vector 706.

In at least one of the various embodiments, matrix 702 ($H^{-1}$) is selected to be the n by n identity portion of the generator matrix (e.g., from generator matrix 602) with one of the n by k rows substituted for the row represented by the failed storage device. In this example, row 710 of matrix 702 represents the row from n by k portion of the generator matrix. Note, the since in this example, there are two levels of global protection provided by in the system (RS1 and RS2 in FIG. 6), if two global failures have occurred a second recovery row may be substituted into recovery matrix 702.

Also, in at least one of the various embodiments, encoded vector 704 is selected such that the element representing the failed storage device (d7 in this case) is replaced with an encoded element that corresponds to the replacement row. Thus, in this example element 712 represents the repair symbol information from the encoded vector (code word) that corresponds to row 710.

Accordingly, the product of the inverse of matrix 702 and vector 704 produce/recover the source data, including the source data from the lost storage device—in this example, element 714 (d7). One of ordinary skill in the art will recognize that the operations described above may be considered standard Reed-Solomon operations. As such, for clarity and brevity the bulk of the arithmetic and algebra is not shown here.

Figure 8:
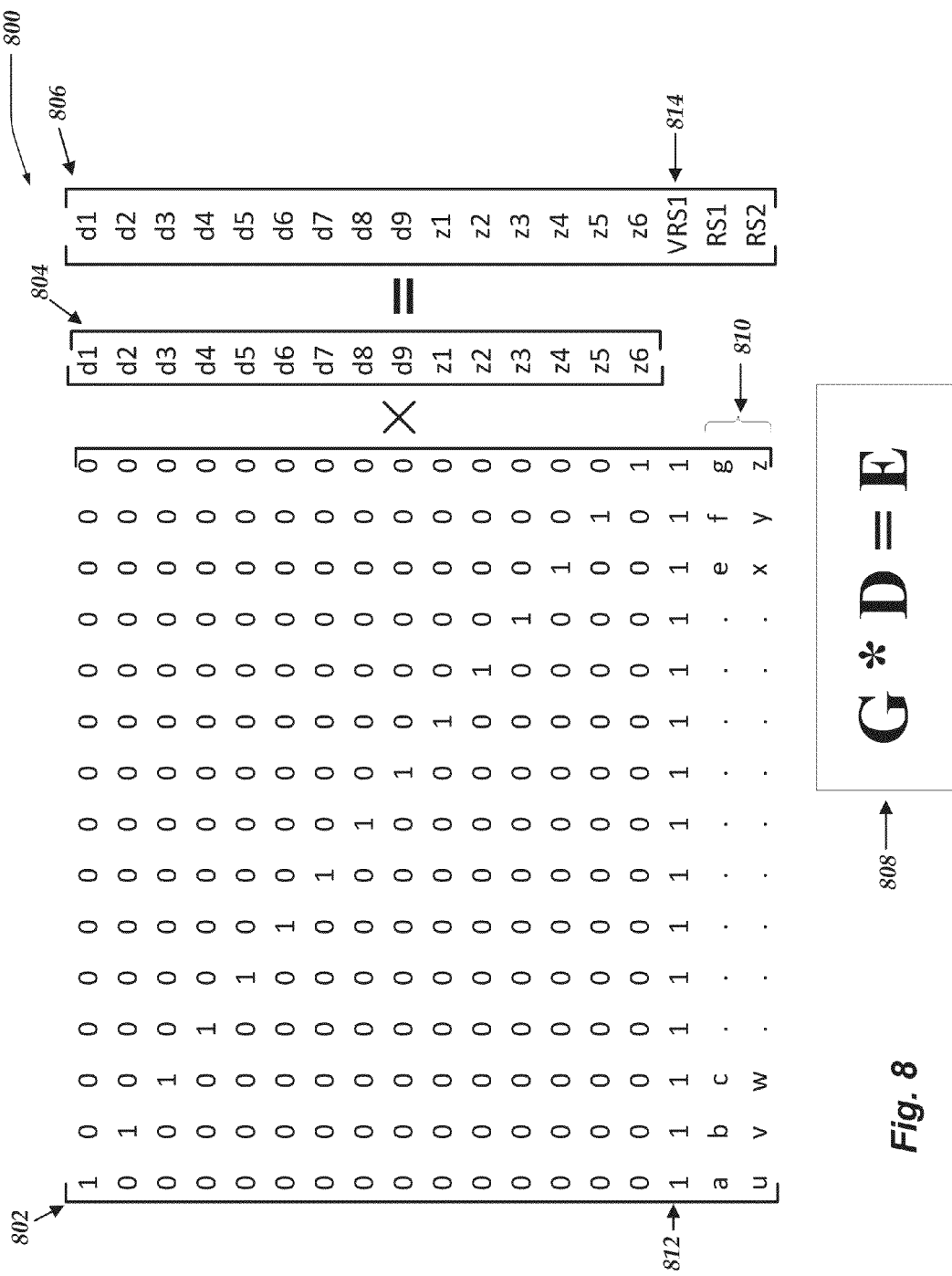
FIG. 8 illustrates a logical representation of a system for improved efficiency for erasure coding in accordance with at least one of the various embodiments.

FIG. 8 illustrates a logical representation of system 800 for improved efficiency for erasure coding in accordance with at least one of the various embodiments. In at least one of the various embodiments, system 800 includes a generator matrix, (matrix 802), a source data vector (vector 804), and an encoded data vector (vector 806). System 800 operates generally the same as a Reed-Solomon coding system, such as, system 600 as described above.

However, the dimensions of generator matrix 802 are selected such that the number of columns, (e.g., its width) is greater than or equal to the number of protected storage devices and is in the set of $\{2^n-1\}$. In other words, the number of columns of generator matrix 802 may be determined as the smallest integer in $2^n-1$ that is greater than or equal to the number of protected storage devices, wherein n is a positive integer. Since $2^n-1$, where n is a positive integer, has the following members $\{0, 1, 3, 7, 15, 31, \ldots 2^n-1\}$ and, in this example, there are nine protected storage devices, the number of columns for a generator matrix is determined to be 15. Likewise, if 15 storage devices were being protected, the number of columns would also be 15. And, if 18 storage devices were being protected, the number of columns would be determined to 31, and so on.

In at least one of the various embodiments, just as described for matrix 602, generator matrix 802 may be determined to have a number of rows equal to the number of columns plus additional rows for the physical global repair symbol devices (RS1, and RS2). Also, since system 800 includes local repair symbol devices another row is added corresponding to a virtual global repair device (VS1). Thus, for this example, generator matrix 802 has 15 columns and 18 rows. Once the dimensions have been determined, a Vandermonde matrix in GF(256) in the determined dimensions may be generated and transformed into generator matrix 802.

In at least one of the various embodiments, determining the number of columns of the Vandermonde matrix to be in $2^n-1$ results in a generator matrix that has a protection row of all ones, such as, row 812, that corresponds to the virtual protection block representing the XOR'd values of the local repair symbol devices. If the number of columns for the generator matrix are a value that is not in $2^n-1$, the row of 111's (row 812) shown in FIG. 8 as coming just after the identity matrix portion of matrix 802 will not be present.

In at least one of the various embodiments, if the determined number of columns for the generator exceeds the number of protected storage devices, those extra columns are still included in the generator matrix. For example, generator matrix 802 has 15 columns even though there are only nine protected storage devices.

In at least one of the various embodiments, to encode data, generator matrix 802 may be multiplied by a source data vector, such as, vector 804. However, since generator matrix 802 may have more columns that there are protected storage devices (due to the requirement that the number of columns must be in $2^n-1$), vector 804 may be determined such that it includes additional elements that correspond to the number of columns that exceed the number of protected storage devices. For example, here matrix 802 has 15 columns for 9 protected storage devices. Accordingly, in this example, there are 6 additional elements that are added to vector 804, shown here as z1-z6. Unlike, the elements of vector 804 labeled as d1-d9, the elements z1-z6 do not correspond to protected storage devices or global repair symbol devices (physical or virtual). The elements z1-z6 of vector 804 perform as placeholders to enable the linear algebraic operations to execute correctly.

Similarly as described for FIG. 6, in at least one of the various embodiments, the product of multiplying a source data generator matrix by a source data vector produces an encoded data vector. The encoded vectors will have a number of rows equals to the number of rows of the generator matrix. In this example, encoded data vector 806 is the product of generator matrix 802 and source data vector 804. Accordingly, in this example, encoded data vector 806 has 18 elements. These elements comprises nine elements corresponding to the d1-d9 storage devices, six elements that correspond to the placeholder/ghost elements z1-z6, one element corresponding to the virtual repair symbols (VRS1), and two elements that correspond to the physical global repair symbol devices, RS1 and RS2. In this example, element 814 in vector 806 represent the virtual repair symbols that correspond to the combined (XOR'd) value of the local repair symbol devices.

Alternatively, the above described encoding process may be described using equation 808. In equation 808, G represents a generator matrix, such as, generator matrix 802, D represents a data vector, such as, data vector 804, and E represents an encoded data vector (code word), such as, encoded data vector 806.

In at least one of the various embodiments, a storage management application, such as, storage management application 320, and/or a network file system application, such as network file system application 317, may be arranged to process data for storage using an erasure coding process such as described above. Accordingly, in at least one of the various embodiments, if a data word, such as, vector 804 is provided for storage it may be encoded using a generator matrix such as generator matrix 802 to produce encoded vector 806 for storage. In at least one of the various embodiments, after the encoded data vector is generated its elements may be distributed to storage devices and the physical repair symbol devices for storage.

Figure 9:
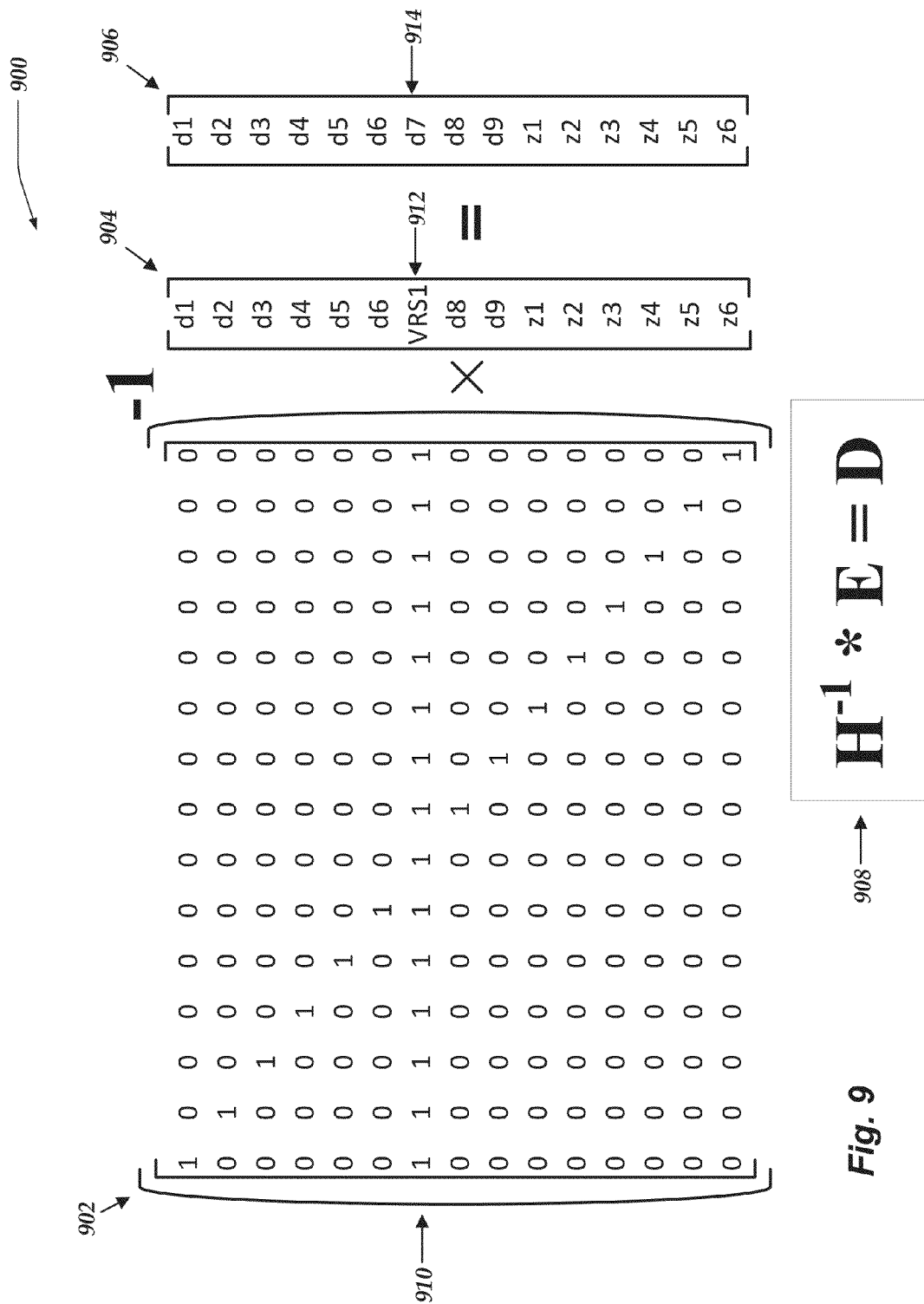
FIG. 9 illustrates an erasure recovery operation for a system that is in accordance with at least one of the various embodiments.

FIG. 9 illustrates erasure recovery for system 900 that is in accordance with at least one of the various embodiments. The purpose of the operations described in FIG. 9 enable data to be recovered if one or more storage units/devices (disk drives) comprising a storage system are lost or otherwise unavailable. Generally speaking with some modification the encoding operations (See, FIG. 8) are reversed to produce the source data from encoded data located on the surviving/remaining storage devices in the storage system. For at least one of the various embodiments, recovery operations may be summarized using equation 908. In equation 908, $H^{-1}$ represents the inverse of a selected portion of the generator matrix, such as, matrix 902, E represents an encoded data vector, such as, vector 904, and D represents a recovered source data vector, such as, vector 906.

In at least one of the various embodiments, most rows for matrix 902 ($H^{-1}$) may be selected from the identity portion of the generator matrix (e.g., from generator matrix 802) with recovery rows substituted for the rows corresponding to the failed storage device. In this example, row 910 of matrix 902 represents the recovery row that is selected from the generator matrix. Note, that since in this example, there are three levels of global protection provided by the system (RS1, RS1, and VRS1 as shown in FIG. 5B and FIG. 8), if more than one global failure occurs an additional recovery rows (if available) may be substituted into recovery matrix 902.

Also, in at least one of the various embodiments, encoded vector 904 is selected such that the element representing the failed storage device (d7 in this case) is replaced with an encoded element that corresponds to the repair symbols in the replacement row. Thus, in this example element 912 represents the repair symbol information from the encoded vector (code word) that corresponds to row 910.

Further, in at least one of the various embodiments, since the recovery matrix is built from rows from the generator matrix (e.g. matrix 802) there may be more columns than there are storage devices. Accordingly, as shown in this example, recovery vector 904 includes an amount of placeholder elements, such as, z1-z6 that correspond to the extra columns. Note, if the number of storage devices is in $2^N-1$ there would be no need for placeholder elements. For example, if there were 15 storage devices there would be no placeholders required.

Also, in at least one of the various embodiments, a storage management application may be arranged to generate the recovery vector by preferentially selecting placeholder elements before any repair elements are chosen. This may be advantageous because placeholder element cost nothing to decode. Accordingly, it would be a "waste" of system resources to repair placeholder elements with real repair symbols.

Accordingly, the product of the inverse of matrix 902 and vector 904 produce/recover the source data, including the source data from the lost storage device. In this example, element 914 (d7) is recovered. One of ordinary skill in the art will recognize that the operations described above may be consistent with a modified Reed-Solomon encoding. As such, for clarity and brevity the bulk of the arithmetic and algebra and/or decoding steps is not shown here.

Furthermore, if a repair symbol device fails, such as, RS1 or RS2, it may be recovered similarly, where the recovery rows are selected to correspond to a surviving repair symbol device or a surviving storage device.

Generalized Operations

FIGS. 10-13 represent the generalized operation for improved efficiency for erasure coding in accordance with at least one of the various embodiments. In at least one of the various embodiments, processes 1000, 1100, 1200, and 1300 described in conjunction with FIGS. 10-13 may be implemented by and/or executed on a single network computer, such as network computer 300 of FIG. 3. In other embodiments, these processes, or portions thereof, may be implemented by and/or executed on a plurality of network computers, such as network computer 300 of FIG. 3. In yet other embodiments, these processes, or portions thereof, may be implemented by and/or executed on one or more virtualized computer, such as, those in a cloud-based environment. However, embodiments are not so limited and various combinations of network computers, client computers, or the like may be utilized. Further, in at least one of the various embodiments, the processes described in conjunction with FIGS. 10-13 may be operative in storage systems and/or architectures such as those described in conjunction with FIGS. 4, 5B, and 8-9.

Figure 10:
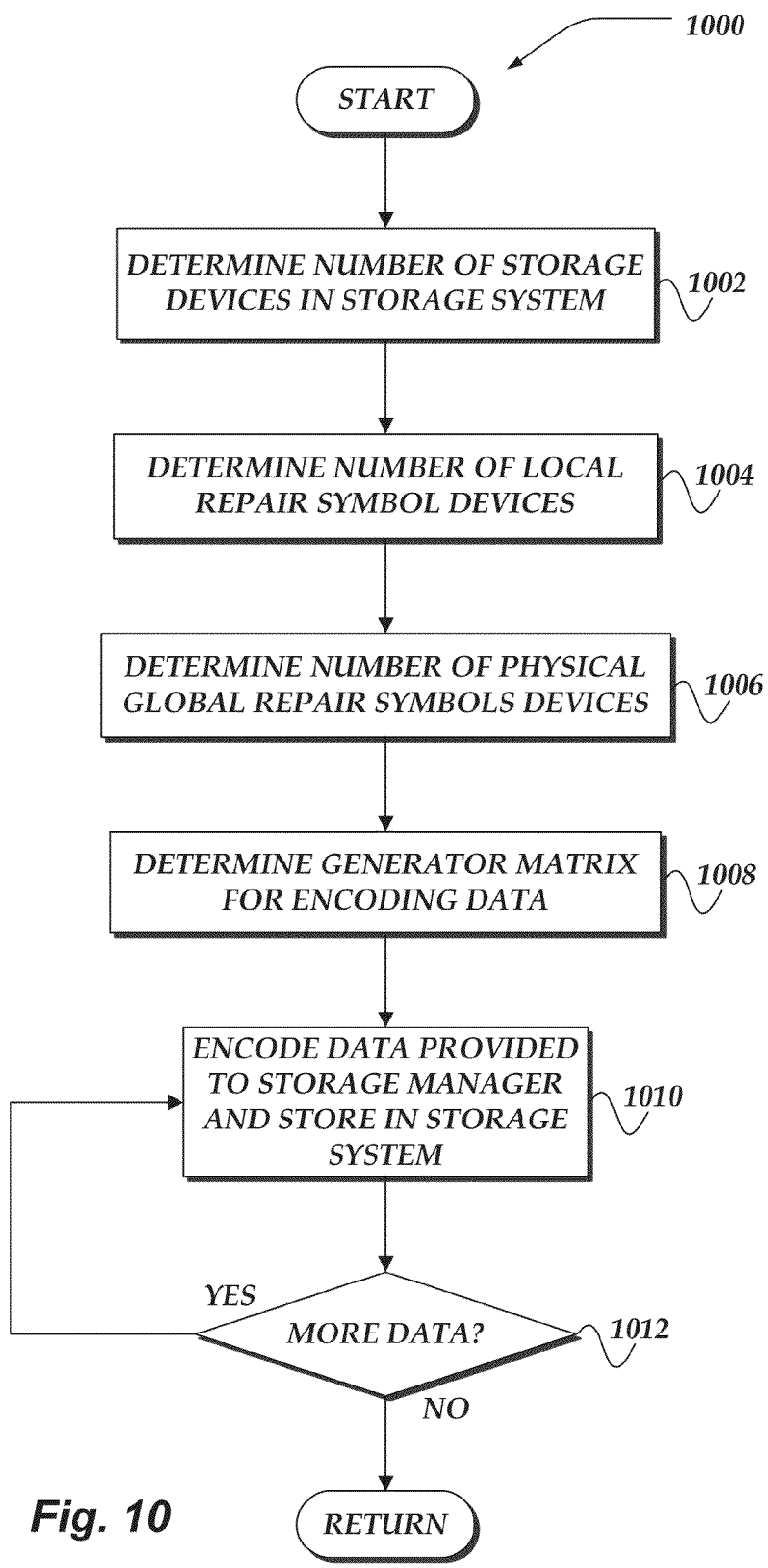
FIG. 10 shows an overview flowchart for a process for improved efficiency for erasure coding in accordance with at least one of the various embodiments.

FIG. 10 shows an overview flowchart for process 1000 for improved efficiency for erasure coding in accordance with at least one of the various embodiments. After a start block, at block 1002, the number of protected storage devices in the system may be determined. In at least one of the various embodiments, a storage system may be arranged to include a number of data storage devices that may be arranged in one or more local groups. See, FIG. 5B for example. In at least one of the various embodiments, storage system may include multiple sets of storage device/repair symbol device combinations. For example, in at least one of the various embodiments, a storage systems may be comprises numerous sets of storage device and repair devices to make up the entire storage system. However, in the interest of brevity and clarity, a storage system will be described herein as having one set of storage devices arranged into multiple local groups with each group having a local repair symbol device. Also, for each so described storage system, a set of one or more physical global repair symbol devices may be assumed and well as virtual global repair symbol 'device' that corresponds to the information stored on the local repair symbol devices for the system. Also, it is envisioned that the innovations described herein may be applied to storage systems that are organized as blocks, files, partial storage devices, whole storage devices, or the like, or combination thereof.

In at least one of the various embodiments, the set of storage devices, local repair symbol devices, and global repair devices may be treated as a repair group or repair set that may be considered to be duplicated as needed for operating at scale in a data center.

At block 1004, in at least one of the various embodiments, the number of local repair symbols devices may be determined. In at least one of the various embodiments, the presence of local repair symbol devices indicates that encoding/recovery operation may have an additional global protection level provided by a virtual global repair symbol device that corresponds to the information encoded and stored in the local repair symbol devices. For example, the storage system in FIG. 5B includes local repair symbol devices 516, 518, and 520. In this example, these three LRS devices may be combined to provide a virtual global repair symbol device, such as, VRS1 522.

At block 1006, in at least one of the various embodiments, the number of physical global repair devices may be determined. As described in FIG. 5B, physical global repair devices are the devices used for storing repair symbols that may be used to recover from global failures. Global failures are failures that may not be recovered from using local repair symbols. In most embodiments, each global repair symbols device (or block) can protected against one device (or block) failure.

At block 1008, in at least one of the various embodiments, a generator matrix for encoding data may be generated. In at least one of the various embodiments, erasure encoding is a transformation of source data into encoded data that includes additional information (repair symbols) that enable data to be recovered for a failed device from other members of the storage system. In most embodiments, the encoding process employs a particularly formed matrix that is used to transform the source data into encoded data. (See, FIG. 8, and FIG. 11). At block 1010, in at least one of the various embodiments, data that may be provided to the storage manager may be encoded and stored in the storage system. In at least one of the various embodiments, after encoding the data the data may be stored in the storage system. The different portions of the encoded data (represented as the different elements in vector 806) may each be stored on different devices and/or disk drives. Thus, if one or more of those devices fail, the lost data may be recovered from the surviving devices, subject to the available protection levels.

At decision block 1012, in at least one of the various embodiments, if there is more data to encode, control may loop back to block 1010; otherwise, control may be returned to a calling process. In at least one of the various embodiments, each source data word provided to the storage manager may be transformed into encoded data using the generator matrix. Accordingly, process 1000 may continue executing if these is data provided for storing.

Figure 11:
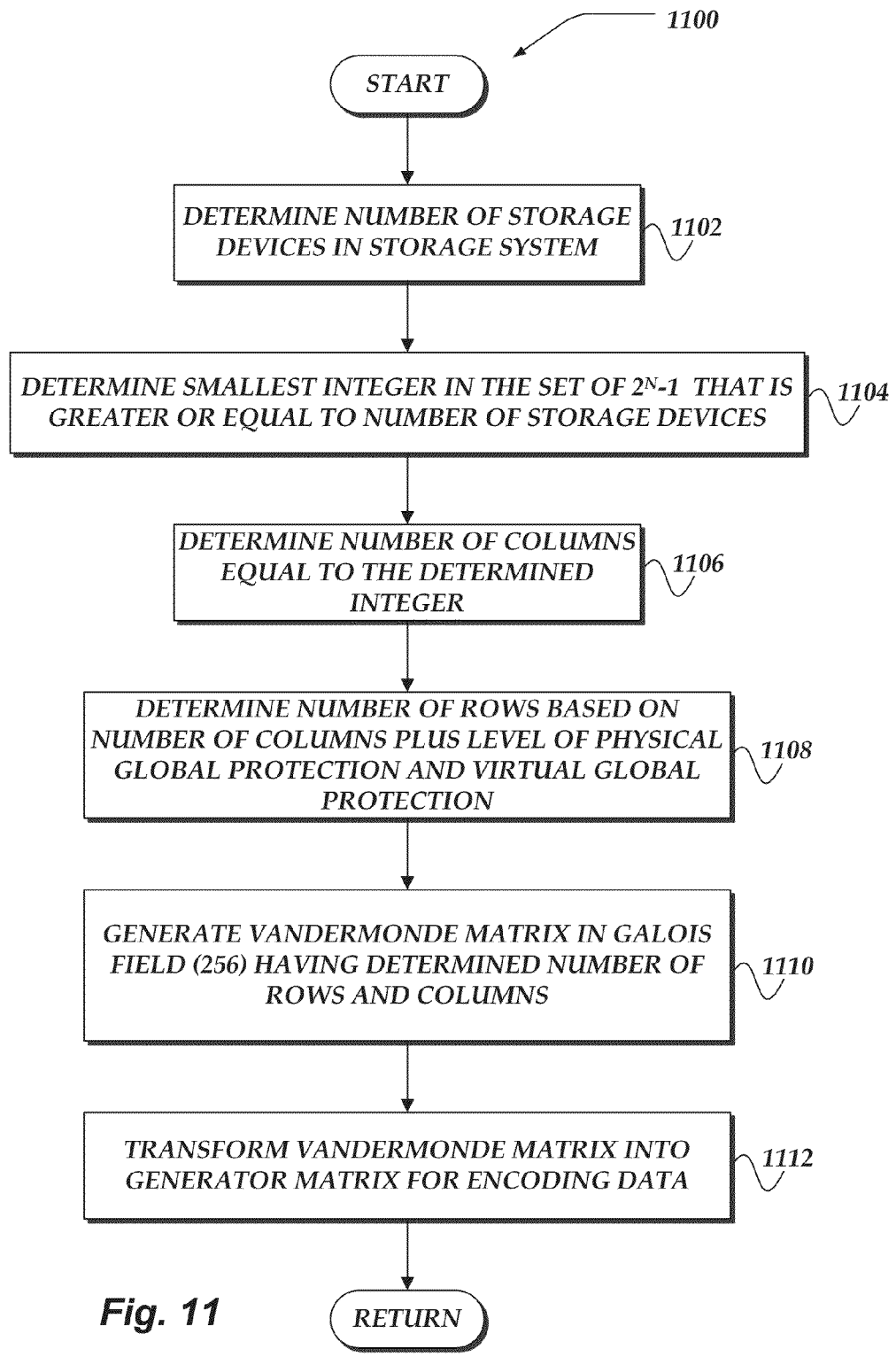
FIG. 11 shows an overview flowchart for a process for generating a generator matrix in accordance with at least one of the various embodiments.

FIG. 11 shows an overview flowchart for process 1100 for generating a generator matrix in accordance with at least one of the various embodiments. After a start block, at block 1102, in at least one of the various embodiments, the number of storage devices in the system may be determined. Note, that this number is not necessarily the total number of storage devices in the entire data center, it is limited to the devices in a repair group that may be comprise a larger storage complex. For example, referring back to FIG. 5B, storage system 506 would be determined to have nine storage devices (e.g., D1-D9). Accordingly, in at least one of the various embodiments, additional devices in the storage system may include local repair symbol devices and global repair symbol devices.

At block 1104, in at least one of the various embodiments, process 1100 may determine the smallest integer in the set $\{2^N-1\}$, that is greater or equal to the number of protected storage devices and where N is an integer. Accordingly, the determined integer will be one of 3, 7, 15, 31, 63, and so on, such that it is greater or equal to the number of storage devices for the system. In at least one of the various embodiments, this determined integer may be used to determine the dimensions of the generator matrix that may be generated for encoding the source data. For example, referring to FIG. 5B, the determined integer for storage system 506 is fifteen because there are nine storage devices.

At block 1106, in at least one of the various embodiments, a number of columns equal to the integer determined by the actions performed for block 1104 may be determined.

At block 1108, in at least one of the various embodiments, a number of rows may be determined by taking the number of columns plus the number of physical global repair symbol devices and the number of virtual global repair symbol blocks. For example, in at least one of the various embodiments, if the storage had two physical global repair symbol devices and one virtual global repair symbol device, the system would be considered to have three levels of protection.

Accordingly, in this example, the number of rows would be determined to be the number of columns plus the three. For example, referring to FIG. 5B, for storage system 506 the number of columns would be 15 as determined in block 1106 and the number of rows would be 15+3 resulting in 18 rows.

At block 1110, in at least one of the various embodiments, a Vandermonde matrix in GF(256) (Galois Field) having the determined number of rows and the determined number of columns may be generated. In at least one of the various embodiments, one of ordinary skill in the art will be familiar with the process of generating a Vandermonde matrix in GF(256) having the determined dimensions. Thus, a detailed explanation of the actions performed for generating the Vandermonde are omitted for brevity. In at least one of the various embodiments, a computer software library or hardware ASIC may be arrange to generate a Vandermonde matrix in GF(256) for a given set of dimensions and a given generator polynomial for the GF(256).

At block 1112, in at least one of the various embodiments, the generated Vandermonde matrix may be transformed into a Generator Matrix for encoding data. In at least one of the various embodiments, one or more basic matrix row operations may be employed to transform the Vandermonde matrix into a generator matrix. As discussing before, the generator matrix may be arranged to comprise an identity matrix followed by multiple rows that contain values that represent the coefficients used for encoding data. In at least one of the various embodiments, there will be one row corresponding to each level of protection supported by the storage system. For example, referring to FIG. 8, rows 810 and row 812 are the rows that correspond to the protection level while the first 15 rows of matrix 802 comprise an identity matrix. Next, control may be returned to a calling process.

One of ordinary skill in the art will appreciate that embodiments are not limited to determining the smallest integer in the set $\{2^N-1\}$, that is greater or equal to the number of protected storage devices and where N is an integer. In some embodiments, different integers and/or sets may be employed. Likewise, these innovations are not limited to using Vandermonde matrices in GF 256, or the like. Thus, other finite fields, integer sets, encoding methods, or the like, are within the scope of these innovations as long as they enable the computation of virtual global repair symbol blocks.

Figure 12:
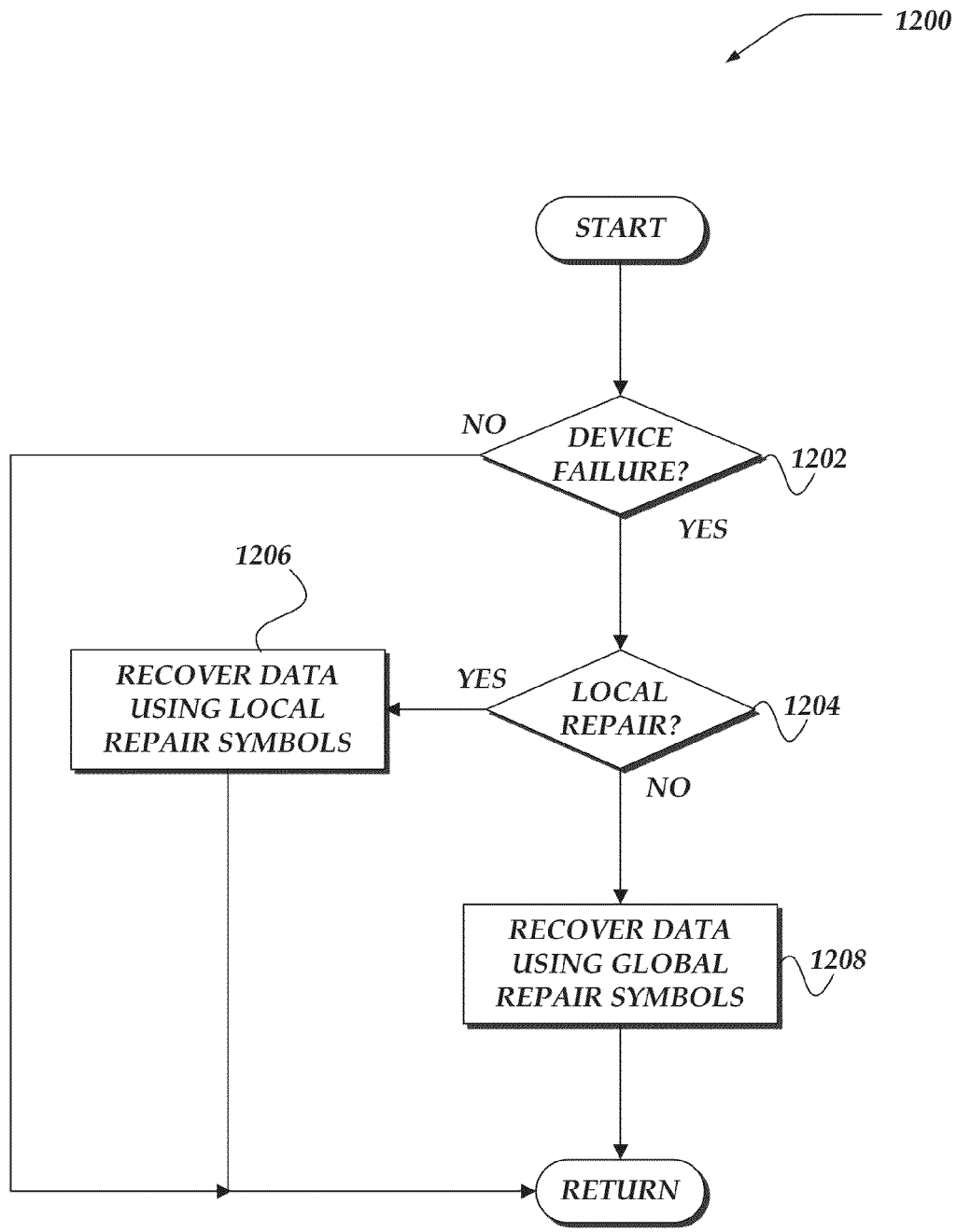
FIG. 12 shows an overview flowchart for a process for recovering from storage device failure in accordance with at least one of the various embodiments.

FIG. 12 shows an overview flowchart for process 1200 for recovering from storage device failure in accordance with at least one of the various embodiments. After a start block, at decision block 1202, if there is a storage device failure, control may flow to decision block 1204; otherwise, may be returned to a calling process.

At decision block 1204, in at least one of the various embodiments, if the data that is located on the failed device may be recovered from the local repair symbols, control may flow to block 1206; otherwise, control may flow to block 1208.

At block 1206, in at least one of the various embodiments, since the data for the failed device may be recovered using local repair symbols, the recovery may occur without using global repair symbols. Next, control may be returned to a calling process. One of ordinary skill in the art will be familiar with one or more erasure coding techniques that employ local repair symbols to recover from a device failure in a local repair group. Accordingly, further discussion of such techniques is omitted for brevity and clarity.

At block 1208, in at least one of the various embodiments, since the data on failed device is not recoverable by the local repair symbols for a local repair group, a recovery process for the lost data may employ global repair symbols stored on one or more of the physical global repair symbol devices and/or the virtual global repair symbol devices. See, FIG. 13. Next, in at least one of the various embodiments, control may be returned to a calling process.

Figure 13:
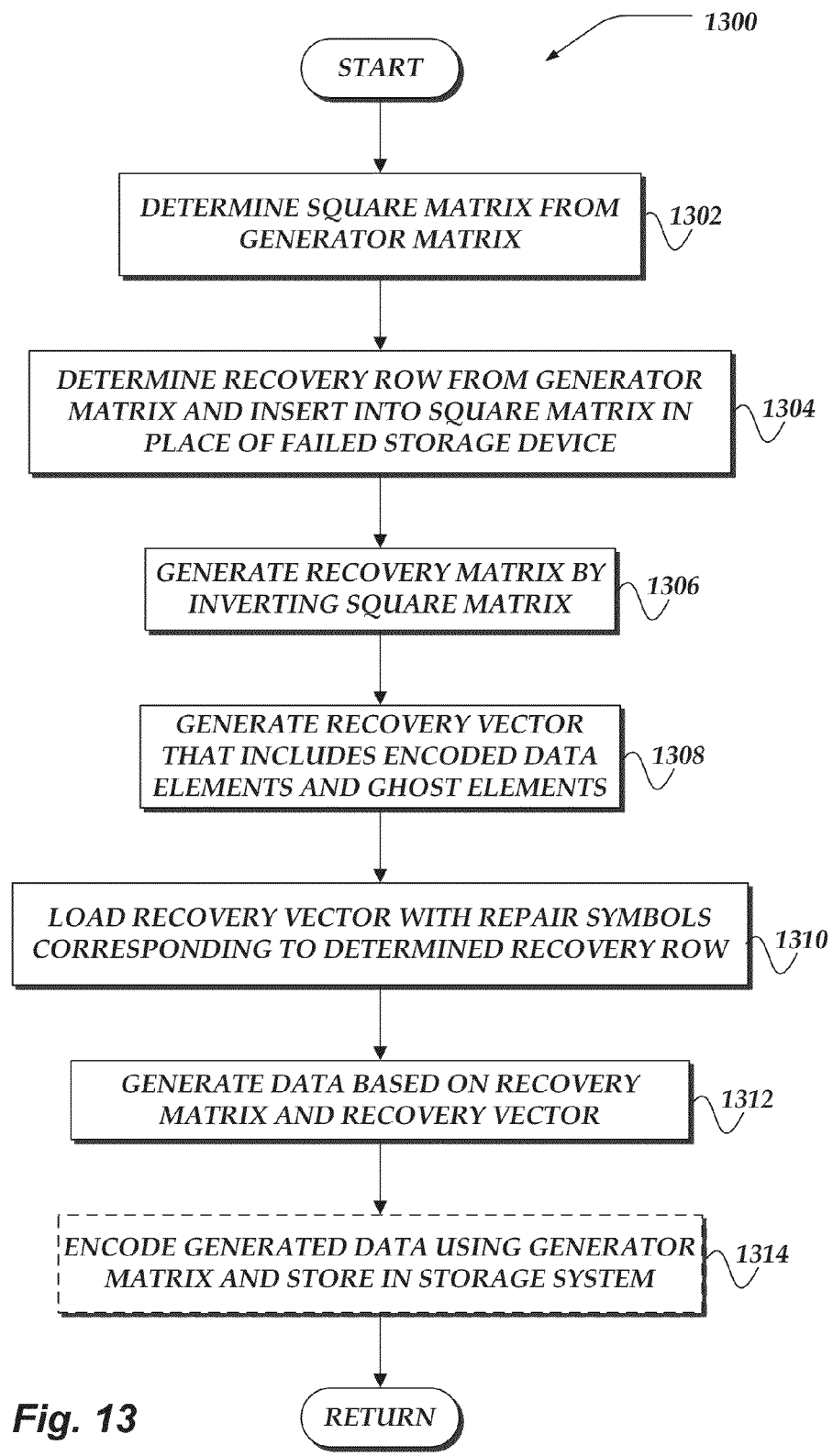
FIG. 13 shows a flowchart of a process for recovering data using global repair symbols in accordance with at least one of the various embodiments.

FIG. 13 shows a flowchart for process 1300 for recovering data using global repair symbols in accordance with at least one of the various embodiments. After a start block, at block 1302, a square matrix may be determined from the generator matrix. In at least one of the various embodiments, a process for recovering data from encoded data may perform actions that include an inverted matrix, such as, $H^{-1}$ shown in equation 908 in FIG. 9. The size and shape and values of the matrix are particularly selected as described herein.

As discussed above, the generator matrix used for encoding the data, such as, matrix 802 in FIG. 8, may be viewed as an identity matrix plus extra rows the correspond to the global protection levels of the storage system. The square matrix may be a matrix equal to the identity portion of the generator matrix. Accordingly, its dimensions (number of columns and number of row) will be the same as the generator matrix used to encode the data.

Accordingly, in at least one of the various embodiments, the square matrix will be arranged to have a number of columns and a number of rows in the set of $\{2^N-1\}$ and greater than the number of protected storage devices (where N is an integer). For example, referring to FIG. 5B, storage system 506 has nine storage devices thus a square matrix for storage system 506 will have 15 columns and 15 rows. Likewise, see, matrix 902 in FIG. 9 for a matrix having the correct number of columns and number of rows for storage system 506.

At block 1304, in at least one of the various embodiments, one or more recovery rows may be determined from the generator matrix to replace the rows in the square matrix that correspond to one or more of the failed devices. At block 1306, in at least one of the various embodiments, a recovery matrix may be generated by inverting the square matrix that include the substituted recovery rows. At block 1308, in at least one of the various embodiments, a recovery vector may be generated that includes the encoded data elements and the placeholder/ghost elements for the data that is being recovered. At block 1310, in at least one of the various embodiments, the recovery vector may be loaded with repair symbols that correspond to the one or more determined recovery rows. At block 1312, in at least one of the various embodiments, the source data may be generated based on the recovery matrix and the recovery vector. At block 1314, in at least one of the various embodiments, optionally, the recovered data may be encoded using the generator matrix and stored into the storage system. Next, control may be returned to a calling process It will be understood that figures, and combinations of actions in the flowchart-like illustrations, can be implemented by computer program instructions. These program instructions may be provided to a processor to produce a machine, such that the instructions executing on the processor create a means for implementing the actions specified in the flowchart blocks. The computer program instructions may be executed by a processor to cause a series of operational actions to be performed by the processor to produce a computer implemented process for implementing the actions specified in the flowchart block or blocks. These program instructions may be stored on some type of machine readable storage media, such as processor readable non-transitory storage media, or the like.

Accordingly, the illustrations support combinations of means for performing the specified actions, combinations of steps for performing the specified actions and program instruction means for performing the specified actions. It will also be understood that each block of the flowchart illustration, and combinations of blocks in the flowchart illustration, can be implemented by modules such as special purpose hardware systems which perform the specified actions or steps, or combinations of special purpose hardware and computer instructions.

What is claimed as new and desired to be protected by Letters Patent of the United States is:

1. A method for erasure coding data using a network computer that performs actions, comprising:
   determining a smallest integer in a set based on a number of storage devices in a storage system, wherein the determined integer is greater or equal to the number of storage devices;
   determining a number of columns that is equal to a value of the determined integer;
   determining a number of rows that is equal to a value of the number of columns plus a number of global repair symbol devices and plus a number of virtual repair symbol devices in the storage system;
   generating a generator matrix in two dimensions based on the number of columns and the number of rows, wherein one or more rows of the generator matrix corresponds to one or more virtual repair symbol devices;

generating the contents of the one or more virtual repair symbol devices based on two or more other repair symbol devices;
encoding data that is provided for storage using at least the contents of the one or more virtual repair symbol devices and the generator matrix; and
storing the encoded data in the storage system without the contents of the one or more virtual repair symbol devices.

2. The method of claim 1, wherein determining the smallest integer in the set, further comprises, determining the smallest integer in the set $\{2^N-1\}$ where N is an integer based on the number of storage devices.

3. The method of claim 1, wherein generating the generator matrix further comprises, generating a Vandermonde matrix in Galois Field 256 with dimensions based on the number of columns and the number of rows.

4. The method of claim 1, further comprising, determining contents of each virtual repair symbol device based on one or more local repair symbol devices.

5. The method of claim 4, wherein determining contents further comprises, XOR'ing the content of the one or more local repair symbol devices to compute the contents of each virtual repair device.

6. The method of claim 1, wherein each virtual repair symbol device enables at least one additional of level of protection against physical storage device failures.

7. The method of claim 1, wherein generating the generator matrix further comprises, when the number of columns for the generator matrix exceeds the number of storage devices, including the additional columns in the generator matrix.

8. The method of claim 1, wherein encoding the provided data, further comprises:
when a data word vector is provided for storage, generating an encoded vector using the generator matrix; and
distributing the encoded vector to the storage devices, the local repair symbol devices, and the global repair symbol devices for storage.

9. A system for erasure coding data, comprising:
a network computer comprising:
a transceiver that communicates over a network;
a memory that stores at least instructions; and
a processor device that executes instructions that enable actions, including:
determining a smallest integer in a set based on a number of storage devices in a storage system, wherein the determined integer is greater or equal to the number of storage devices;
determining a number of columns that is equal to a value of the determined integer;
determining a number of rows that is equal to a value of the number of columns plus a number of global repair symbol devices and plus a number of virtual repair symbol devices in the storage system;
generating a generator matrix in two dimensions based on the number of columns and the number of rows, wherein one or more rows of the generator matrix corresponds to one or more virtual repair symbol devices;
generating the contents of the one or more virtual repair symbol devices based on two or more other repair symbol devices;
encoding data that is provided for storage using at least the contents of the one or more virtual repair symbol devices and the generator matrix; and
storing the encoded data in the storage system without the contents of the one or more virtual repair symbol devices; and
a client computer comprising:
a transceiver that communicates over a network;
a memory that stores at least instructions; and
a processor device that executes instructions that enable actions, including:
providing the data to the network computer.

10. The system of claim 9, wherein determining the smallest integer in the set, further comprises, determining the smallest integer in the set $\{2^N-1\}$ where N is an integer based on the number of storage devices.

11. The system of claim 9, wherein generating the generator matrix further comprises, generating a Vandermonde matrix in Galois Field 256 with dimensions based on the number of columns and the number of rows.

12. The system of claim 9, wherein the network computer processor device enables actions, further comprising, determining contents of each virtual repair symbol device based on one or more local repair symbol devices.

13. The system of claim 12, wherein determining contents further comprises, XOR'ing the content of the one or more local repair symbol devices to compute the contents of each virtual repair device.

14. The system of claim 9, wherein each virtual repair symbol device enables at least one additional of level of protection against physical storage device failures.

15. The system of claim 9, wherein generating the generator matrix further comprises, when the number of columns for the generator matrix exceeds the number of storage devices, including the additional columns in the generator matrix.

16. The system of claim 9, wherein encoding the provided data, further comprises:
when a data word vector is provided for storage, generating an encoded vector using the generator matrix; and
distributing the encoded vector to the storage devices, the local repair symbol devices, and the global repair symbol devices for storage.

17. A processor readable non-transitory storage media that includes instructions for erasure coding data, wherein execution of the instructions by a processor device enables actions, comprising:
determining a smallest integer in a set based on a number of storage devices in a storage system, wherein the determined integer is greater or equal to the number of storage devices;
determining a number of columns that is equal to a value of the determined integer;
determining a number of rows that is equal to a value of the number of columns plus a number of global repair symbol devices and plus a number of virtual repair symbol devices in the storage system;
generating a generator matrix in two dimensions based on the number of columns and the number of rows, wherein one or more rows of the generator matrix corresponds to one or more virtual repair symbol devices;
generating the contents of the one or more virtual repair symbol devices based on two or more other repair symbol devices;
encoding data that is provided for storage using at least the contents of the one or more virtual repair symbol devices and the generator matrix; and
storing the encoded data in the storage system without the contents of the one or more virtual repair symbol devices.

18. The media of claim 17, wherein determining the smallest integer in the set, further comprises, determining the smallest integer in the set $\{2^N-1\}$ where N is an integer based on the number of storage devices.

19. The media of claim 17, wherein generating the generator matrix further comprises, generating a Vandermonde matrix in Galois Field 256 with dimensions based on the number of columns and the number of rows.

20. The media of claim 17, further comprising, determining contents of each virtual repair symbol device based on one or more local repair symbol devices.

21. The media of claim 20, wherein determining contents further comprises, XOR'ing the content of the one or more local repair symbol devices to compute the contents of each virtual repair device.

22. The media of claim 17, wherein each virtual repair symbol device enables at least one additional of level of protection against physical storage device failures.

23. The media of claim 17, wherein generating the generator matrix further comprises, when the number of columns for the generator matrix exceeds the number of storage devices, including the additional columns in the generator matrix.

24. A network computer that performs erasure coding data, comprising:
  a transceiver that communicates over a network;
  a memory that stores at least instructions; and
  a processor device that executes instructions that enable actions, including:
    determining a smallest integer in a set based on a number of storage devices in a storage system, wherein the determined integer is greater or equal to the number of storage devices;
    determining a number of columns that is equal to a value of the determined integer;
    determining a number of rows that is equal to a value of the number of columns plus a number of global repair symbol devices and plus a number of virtual repair symbol devices in the storage system;
    generating a generator matrix in two dimensions based on the number of columns and the number of rows, wherein one or more rows of the generator matrix corresponds to one or more virtual repair symbol devices;
    generating the contents of the one or more virtual repair symbol devices based on two or more other repair symbol devices;
    encoding data that is provided for storage using at least the contents of the one or more virtual repair symbol devices and the generator matrix; and
    storing the encoded data in the storage system without the contents of the one or more virtual repair symbol devices.

25. The network computer of claim 24, wherein determining the smallest integer in the set, further comprises, determining the smallest integer in the set $\{2^N-1\}$ where N is an integer based on the number of storage devices.

26. The network computer of claim 24, wherein generating the generator matrix further comprises, generating a Vandermonde matrix in Galois Field 256 with dimensions based on the number of columns and the number of rows.

27. The network computer of claim 24, wherein the processor device enables actions, further comprising, determining contents of each virtual repair symbol device based on one or more local repair symbol devices.

28. The network computer of claim 27, wherein determining contents further comprises, XOR'ing the content of the one or more local repair symbol devices to compute the contents of each virtual repair device.

29. The network computer of claim 24, wherein each virtual repair symbol device enables at least one additional of level of protection against physical storage device failures.

30. The network computer of claim 24, wherein generating the generator matrix further comprises, when the number of columns for the generator matrix exceeds the number of storage devices, including the additional columns in the generator matrix.

* * * * *

UNITED STATES PATENT AND TRADEMARK OFFICE
CERTIFICATE OF CORRECTION

PATENT NO. : 9,116,833 B1
APPLICATION NO. : 14/576095
DATED : August 25, 2015
INVENTOR(S) : Rakitzis et al.

It is certified that error appears in the above-identified patent and that said Letters Patent is hereby corrected as shown below:

On the title page, in the Figure, delete " 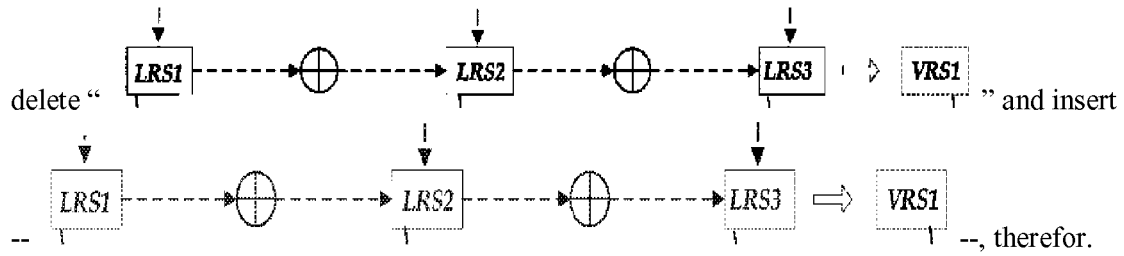 " and insert -- 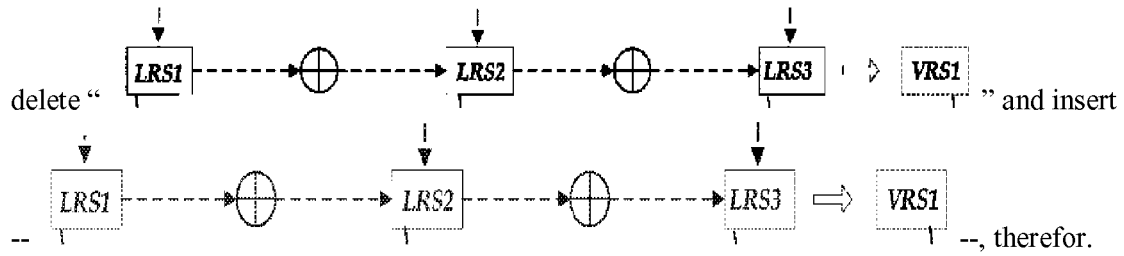 --, therefor.

In the drawings

In Fig. 5B, Sheet 5 of 13, delete " 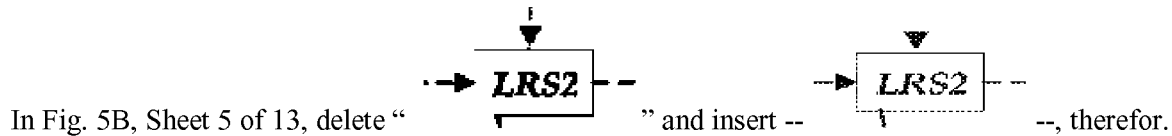 " and insert -- 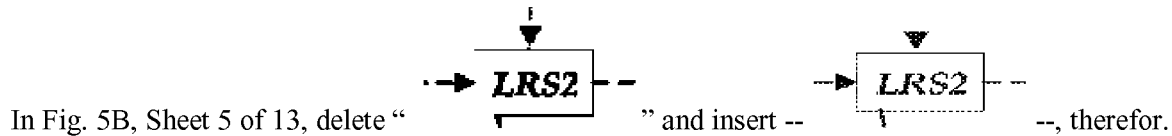 --, therefor.

In Fig. 7, Sheet 7 of 13, delete " $H^{-1} * E = D$ " and insert -- $H^{-1} * E = D$ --, therefor.

In the specification

In Column 15, Line 48, delete "LRS" and insert -- (LRS) --, therefor.

In Column 16, Line 59, delete "a identity" and insert -- an identity --, therefor.

In Column 19, Line 67, delete "(RS1, RS1, and" and insert -- (RS1, RS2, and --, therefor.

Signed and Sealed this
Tenth Day of May, 2016

Michelle K. Lee
*Director of the United States Patent and Trademark Office*

CERTIFICATE OF CORRECTION (continued)
U.S. Pat. No. 9,116,833 B1

In the specification

In Column 21, Line 6, delete "may be comprises" and insert -- may comprise --, therefor.

In Column 22, Line 13, delete "may be comprise" and insert -- may comprise --, therefor.

In Column 24, Line 24, delete "process" and insert -- process. --, therefor.